(12) United States Patent
Xu et al.

(10) Patent No.: US 11,856,243 B2
(45) Date of Patent: Dec. 26, 2023

(54) METHOD, DEVICE, AND COMPUTER STORAGE MEDIUM FOR MANAGING VIRTUAL STREAMING

(71) Applicant: Alibaba (China) Co., Ltd., Hangzhou (CN)

(72) Inventors: Jin Xu, Hangzhou (CN); Ding Jiandong, Hangzhou (CN)

(73) Assignee: ALIBABA (CHINA) CO., LTD., Hangzhou (CN)

( * ) Notice: Subject to any disclaimer, the term of this patent is extended or adjusted under 35 U.S.C. 154(b) by 0 days.

(21) Appl. No.: 17/681,875

(22) Filed: Feb. 28, 2022

(65) Prior Publication Data
US 2022/0294837 A1 Sep. 15, 2022

(30) Foreign Application Priority Data
Mar. 15, 2021 (CN) .......................... 202110277620.X

(51) Int. Cl.
| | | |
|---|---|---|
| G06F 15/16 | (2006.01) | |
| H04N 21/2187 | (2011.01) | |
| H04L 65/403 | (2022.01) | |
| H04W 4/06 | (2009.01) | |
| H04L 67/14 | (2022.01) | |

(52) U.S. Cl.
CPC ....... *H04N 21/2187* (2013.01); *H04L 65/403* (2013.01); *H04L 65/4046* (2013.01); *H04L 67/14* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 7,996,264 B2 | 8/2011 | Kusumoto et al. | |
| 8,543,665 B2 | 9/2013 | Ansari et al. | |
| 8,727,892 B1 | 5/2014 | Chun | |
| 9,101,836 B1 * | 8/2015 | Brenden | A63F 13/86 |
| 9,210,100 B2 | 12/2015 | van der Linden et al. | |
| 9,235,941 B2 | 1/2016 | Ricci et al. | |
| 9,276,959 B2 | 3/2016 | Theimer et al. | |
| 9,734,463 B2 | 8/2017 | Skeen et al. | |
| 9,977,687 B2 | 5/2018 | Kottomtharayil et al. | |

(Continued)

FOREIGN PATENT DOCUMENTS

WO WO-2016196690 A1 * 12/2016 ........... G06F 16/328

*Primary Examiner* — Phyllis A Book
(74) *Attorney, Agent, or Firm* — James J. DeCarlo; Greenberg Traurig, LLP

(57) ABSTRACT

Provided in the example embodiments are a method, electronic device, and computer storage medium for managing virtual streaming. The method for managing virtual streaming includes: providing a configuration interface for configuring a virtual streaming room with configuration settings, the configuration settings including at least an audience group setting, and a host setting related to a virtual host; receiving, via the configuration interface, configuration input corresponding to the audience group setting, and/or the host setting; and based on the configuration input, generating a host assignment rule, the host assignment rule for assigning at least one virtual host to at least one audience group. The example embodiments solve the problems in which the form of an existing virtual host is fixed, audience adhesion is poor, and use thereof is inflexible.

19 Claims, 15 Drawing Sheets

(56) References Cited

U.S. PATENT DOCUMENTS

| | | | | |
|---|---|---|---|---|
| 10,785,325 B1* | 9/2020 | Baishya | ............... | H04L 67/1095 |
| 2004/0078371 A1* | 4/2004 | Worrall | ............... | G06F 21/6218 |
| | | | | 707/999.009 |
| 2008/0263460 A1* | 10/2008 | Altberg | ................. | G06Q 30/02 |
| | | | | 715/757 |
| 2012/0331401 A1* | 12/2012 | Tipirneni | ............. | G06F 16/951 |
| | | | | 715/753 |
| 2014/0229866 A1* | 8/2014 | Gottlieb | ................ | G06F 3/0486 |
| | | | | 709/204 |
| 2016/0205431 A1 | 1/2016 | Avedissian et al. | | |
| 2016/0050244 A1* | 2/2016 | Corlett | ................. | H04L 65/612 |
| | | | | 709/231 |
| 2019/0102941 A1* | 4/2019 | Khan | .................... | G06T 19/006 |
| 2019/0138642 A1 | 5/2019 | Pal et al. | | |
| 2019/0273955 A1* | 9/2019 | Yu | .................... | H04N 21/21805 |
| 2019/0324436 A1 | 10/2019 | Cella et al. | | |
| 2019/0378331 A1 | 12/2019 | David et al. | | |
| 2021/0056750 A1* | 2/2021 | Rowley | ..................... | G06T 7/73 |
| 2021/0291062 A1* | 9/2021 | Tulewicz | ............. | A63F 13/795 |
| 2021/0314639 A1 | 10/2021 | Li | | |
| 2021/0329047 A1 | 10/2021 | Li | | |

* cited by examiner

| Audience grouping | Virtual host | Streaming session | Streaming object | Streaming assistant |

Streaming effect data displaying region of each audience group

Streaming effect data analysis region of each audience group

Virtual host setting of each audience group ( OK )  ( Cancel )

FIG. 4C

METHOD, DEVICE, AND COMPUTER STORAGE MEDIUM FOR MANAGING VIRTUAL STREAMING

CROSS-REFERENCE TO RELATED APPLICATIONS

This application claims the benefit of priority of Chinese Application No. 202110277620.X, filed on Mar. 15, 2021, which is hereby incorporated by reference in its entirety

BACKGROUND

Technical Field

The example embodiments relate to the technical field of computing devices, and in particular to methods, devices, and computer storage media for managing virtual streaming.

Description of the Related Art

With the rise of streaming, many platforms have launched network streaming rooms to stream various streaming objects (e.g., commodities, programs, etc.). However, a lack of resources, such as sites and streaming professionals, limits the application and promotion of streaming. Currently, virtual streaming rooms are one attempt to solve such problems.

Generally, a virtual streaming room may be implemented in the form of a real physical space plus a virtual host or a virtual physical space plus a virtual host. No matter which form is used, after being generated, current virtual streaming rooms or virtual hosts are uniformly assigned to different platforms or users and used by the same. However, on the one hand, the forms of these virtual streaming rooms or virtual hosts are fixed, and most audiences see the same virtual streaming room or virtual host. In contrast, audience preferences vary, and therefore the appeal of such rooms or hosts may not be sufficient enough for some audiences, resulting in the loss of these audiences. On the other hand, this also results in an inflexible virtual streaming room or the virtual host.

BRIEF SUMMARY

Accordingly, the example embodiments provide a scheme for managing virtual streaming to at least partially solve the aforementioned problems.

According to a first aspect of the example embodiments, a method for managing virtual streaming is provided and comprises: providing a configuration interface for configuring a virtual streaming room with configuration settings, the configuration settings including at least an audience group setting, and a host setting related to a virtual host; receiving, via the configuration interface, configuration input corresponding to the audience group setting, and/or the host setting; and based on the configuration input, generating a host assignment rule, the host assignment rule for assigning at least one virtual host to at least one audience group.

According to a second aspect of the example embodiments, a method for managing virtual streaming is provided, and comprises: receiving a trigger instruction for configuring a virtual streaming room with configuration settings; based on the trigger instruction, displaying a corresponding configuration interface, and receiving at least one of the following configuration input inputted via the configuration interface: a virtual host setting, an audience group setting, and a streaming object setting; and based on the configuration input, generating the virtual streaming room.

According to a third aspect of the example embodiments, an electronic device is provided and comprises: a display, an input device, a processor, a memory, a communication interface, and a communication bus, wherein the display, the input device, the processor, the memory, and the communication interface communicate with each other via the communication bus; the display is used to display a configuration interface for configuring a virtual streaming room with configuration settings, the configuration settings including at least an audience group setting, and a host setting related to a virtual host; the input device is used to provide configuration input inputted via the configuration interface; the memory is used to store at least one executable instruction, and the executable instruction causes the processor to perform operations corresponding to the method for managing virtual streaming according to the first aspect.

According to a fourth aspect of the example embodiments, a computer storage medium is provided and has a computer program stored thereon, wherein the program, when executed by a processor, implements the method for managing virtual streaming according to the first aspect.

According to the scheme for managing virtual streaming provided by the example embodiments, firstly, a configuration interface for configuring a virtual streaming room is provided, and a corresponding audience group setting and virtual host setting can be inputted via the configuration interface based on actual streaming requirements. Then, a corresponding host assignment rule can be generated based on these settings, and the host assignment rule can guide subsequent assignment of virtual hosts. On this basis, on the one hand, audience grouping can be performed based on features of audiences to view streaming to provide, in a targeted manner, virtual hosts matching different audience groups to meet features and requirements of different audiences. On the other hand, the virtual hosts can be assigned based on different features of the virtual hosts, so that a virtual host better matches an audience and a virtual streaming room, and that assignment flexibility is higher. Therefore, the streaming effects of the virtual streaming room are greatly improved, and audience adherence is also improved. Therefore, the schemes, according to the example embodiments, solve the problems in which the form of an existing virtual host is fixed, audience adhesion is poor, and the use thereof is inflexible.

BRIEF DESCRIPTION OF THE DRAWINGS

The accompanying drawings to be used in the description of the embodiments are briefly described below. The accompanying drawings in the following description are merely some of the example embodiments. A person of ordinary skill in the art can further obtain other accompanying drawings according to these accompanying drawings.

FIG. 4C is a block diagram of an audience group setting sub-interface for adjustment according to some of the example embodiments.

DETAILED DESCRIPTION OF EMBODIMENTS

The technical solutions in the example embodiments will be described clearly and completely below with reference to the accompanying drawings allowing those skilled in the art to better understand the technical solutions. The described embodiments are merely some rather than all of the example embodiments. All other embodiments obtained by those of ordinary skill in the art on the basis of the example embodiments shall fall within the scope of protection of the example embodiments. Specific implementations of the example embodiments will be further described below with reference to the accompanying drawings.

Figure 1A:
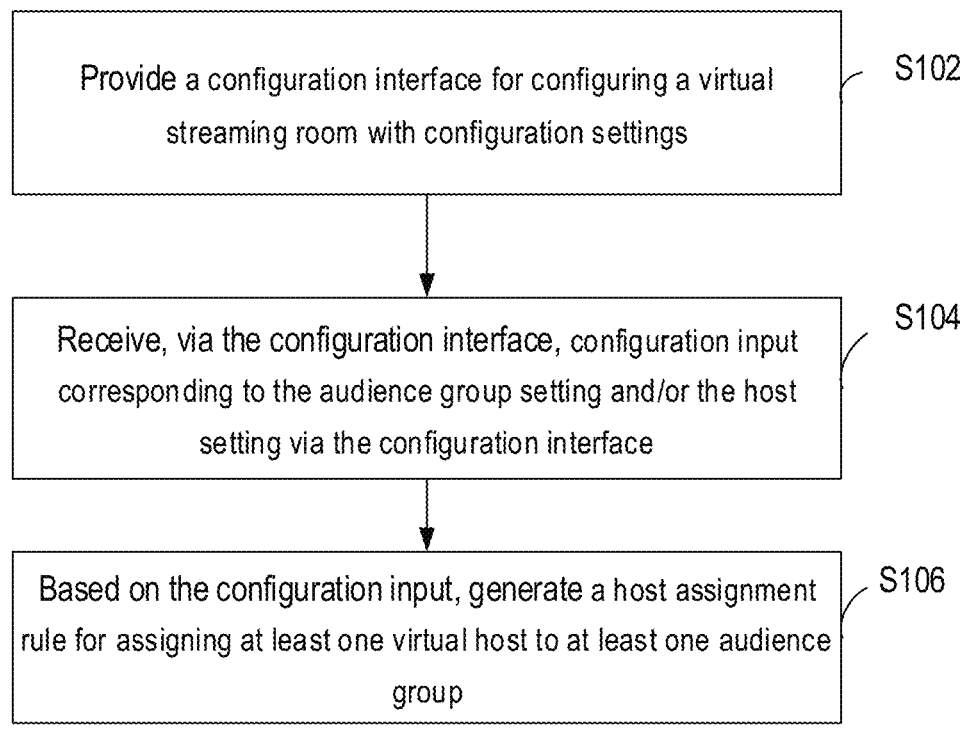
FIG. 1A is a flow diagram illustrating a method for managing virtual streaming according to some of the example embodiments.

FIG. 1A is a flow diagram illustrating a method for managing virtual streaming according to some of the example embodiments. In the illustrated embodiment, the method for managing virtual streaming according to these example embodiments includes the following steps.

In step S102, the method can include providing a configuration interface for configuring a virtual streaming room with configuration settings.

In an embodiment, the configuration settings include at least an audience group setting and a host setting related to a virtual host.

In an embodiment, the audience group setting is used to pre-group audiences based on a certain rule. Generally, audiences in the same group can have certain commonalities, namely audience features of the audiences in a group such as a preference feature, an attribute feature, a geographic region feature, an operation behavior feature, etc. The rule can be appropriately configured by those skilled in the art based on actual requirements. For example, grouping is performed based on audience tags (e.g., a new audience tag, a returning audience tag, etc.), grouping is performed based on audience features (e.g., a preference feature, historical behavior feature, etc.), or grouping is performed based on audience attributes (e.g., a geographical region or an occupation).

In some embodiments, the number of virtual hosts is greater than one. In these embodiments, the host setting can be used to determine and indicate information of each virtual host, such as image information of the host, feature information of the host, information about historical streaming behavior data, and streaming effect data of the host, etc.

Therefore, the configuration interface can provide an interaction method readily used by a user to perform configuration settings.

In step S104, the method can include receiving configuration input corresponding to the audience group setting and/or the host setting via the configuration interface.

As described above, the configuration interface provides the user with an interaction method for setting or modifying configuration settings. Using the configuration interface, the user can perform corresponding configuration input to specifically configure a virtual streaming room.

In an embodiment, the audience group setting may include at least one of the following: a group name setting, a group audience feature setting, and a group audience count setting. The group name setting can be used to subsequently manage each audience group. The group audience feature setting can be used to indicate the audience feature of each group to provide a basis for subsequent matching to a virtual host. The group audience count setting can be used to divert audiences and manage the size of each group.

In an embodiment, the host setting may include at least one of the following: a host feature setting and an audience proportion setting corresponding to a host. In an embodiment, the host setting may further include at least one of the following: a host script setting, a host image setting, and a host voice setting. The host feature can indicate characteristics of a virtual host, such as a feature representing a host type (e.g., a business type, a household type, a fashion type, etc.), a feature representing historical streaming behaviors of the host, a feature representing historical streaming objects of the host, a feature representing historical streaming effects of the host, a feature representing viewing audiences of historical streaming of the host, etc. An audience proportion corresponding to a host can be used to achieve audience diversion and assign different numbers of audiences to different hosts to provide a basis for subsequent streaming effect analysis, comparison, and adjustment for the host. The host script setting can set, based on actual streaming requirements, a streaming script to be used by the virtual host. In an embodiment, the streaming script can be a script template. In an embodiment, relevant information of a streaming object to be streamed (e.g., a program (a crosstalk program, a talk show program, a reading program, an audio and video introduction program, etc.) and a commodity) may be input into the script template and then a script for the streaming object can be generated without the need to perform manual setting, thereby improving the efficiency of script generation and a utilization rate of the script. The host image setting is mainly used to set an image of the host displayed, and includes, but is not limited to, a clothing setting, a facial image setting, a body image setting, a body action setting, an auxiliary prop setting, etc. The host voice setting is mainly used to set a broadcasting sound and style of the host, such as a sound type setting, a line style setting, a sound mood setting, etc.

The above settings instantiate the audience and the host, thereby meeting actual streaming requirements.

In step S106, the method can include generating, based on the configuration input, a host assignment rule for assigning at least one virtual host to at least one audience group.

By means of the aforementioned configuration input, the corresponding host assignment rule can be generated. In this manner, virtual host assignment can be achieved for each audience group. For example, N virtual hosts may be assigned to corresponding N audience groups (where N is a positive integer). Alternatively, N virtual hosts may be assigned to N−M audience groups (where M is a positive integer less than N). Alternatively, N virtual hosts may be assigned to N+P audience groups (where P is a positive integer). In an example, it is assumed that there are three audience groups, then three different virtual hosts may be assigned to the three audience groups. Alternatively, one virtual host may be assigned to two of the three audience groups, and another virtual host may be assigned to the other audience group. Alternatively, two virtual hosts may be assigned to one of the audience groups, and another two virtual hosts may be assigned to the other two audience groups, etc.

In the following, a specific example is used to illustratively describe the aforementioned process, as discussed in connection with FIG. 1B.

Figure 1B:
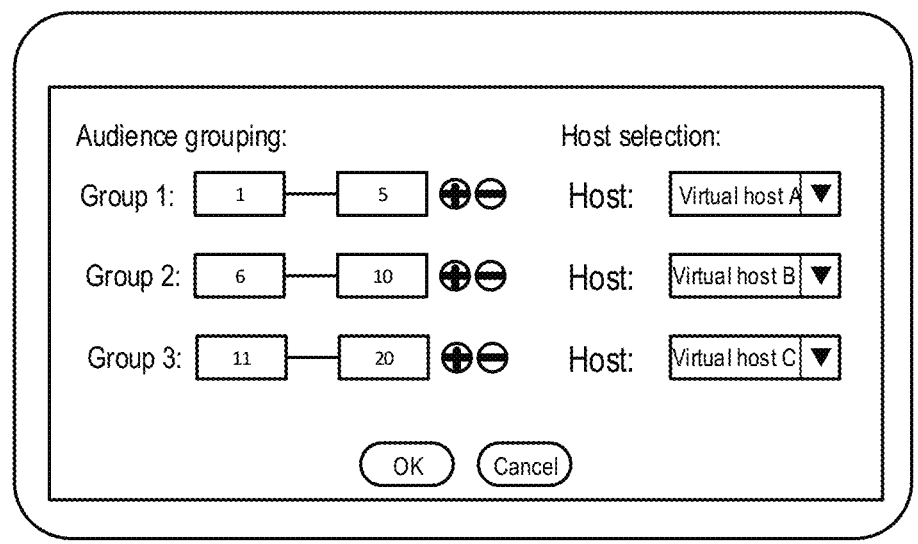
FIG. 1B is a block diagram of a configuration interface according to some of the example embodiments.

In FIG. 1B, a configuration interface for configuring a virtual streaming room with configuration settings is briefly illustrated. In an embodiment, the configuration interface includes a setting for performing audience group setting and a setting for performing host setting related to a virtual host.

An application scene in which cakes of Brand X are to be sold is used as an example.

It is assumed that streaming audiences include new audiences (numbered 1-10) having not purchased this cake before and returning audiences (numbered 11-20) having purchased this cake before. Then, as shown in FIG. 1B, the audience group setting can be used to group the audiences 1-20 into three distinct groups, where audiences 1-5 are in a first group ("Group 1"), 6-10 are in a second group ("Group 2"), and 11-20 are in a third group ("Group 3"). In specific group setting, specific audience grouping can be achieved by any appropriate method such as inputting an audience number, clicking on a displayed audience number icon, etc. In this example, it is assumed that three virtual hosts A, B, and C are correspondingly selected for three groups, and each group corresponds to one virtual host. The selection of the three virtual hosts may be, for example, that three virtual hosts are selected from a plurality of pre-configured virtual hosts, or that three virtual hosts are obtained by means of matching based on commodities to be sold, namely the cakes, or that three virtual hosts are obtained by means of matching based on audience features of the three audience groups, etc.

On the basis of the above settings in this example, virtual host A is assigned to the Group 1, virtual host B is assigned to the Group 2, and virtual host C is assigned to the Group 3. FIG. 1B illustrates that a downward arrow on the right side can be clicked on to display a drop-down menu and a corresponding virtual host can be selected from the drop-down menu. After the audience groups have been determined and the corresponding virtual hosts have been assigned, the pre-configured virtual streaming room can be performed. In this virtual streaming room, three virtual hosts perform, for respective audience groups, streaming on selling the cakes of Brand X. Therefore, if different audience groups match different virtual hosts, then a streaming effect may also be different, and this can provide a basis for a subsequent statistical operation and analysis on the streaming effect and for adjustments on the virtual host and the audience group.

According to an embodiment, firstly, a configuration interface for configuring a virtual streaming room is provided, and a corresponding audience group setting and virtual host setting can be inputted via the configuration interface based on actual streaming requirements. Then, a corresponding host assignment rule can be generated based on these settings, and the host assignment rule can guide subsequent assignment of virtual hosts. On this basis, on the one hand, audience grouping can be performed based on features of audiences to view streaming to provide, in a targeted manner, virtual hosts matching different audience groups to meet features and requirements of different audiences. On the other hand, the virtual hosts can be assigned based on different features of the virtual hosts, so that a virtual host better matches an audience and a virtual streaming room, and that assignment flexibility is higher. Therefore, a streaming effect of the virtual streaming room is greatly improved, and audience adherence is also improved. Therefore, the schemes according to the example embodiments solve the problems in which the form of an existing virtual host is fixed, audience adhesion is poor, and use thereof is inflexible.

The method for managing virtual streaming according to this embodiment may be executed by any appropriate electronic device having data processing capabilities, including but not limited to a server, a mobile terminal (e.g., a mobile phone, a tablet, etc.), a personal computer, etc.

Figure 2A:
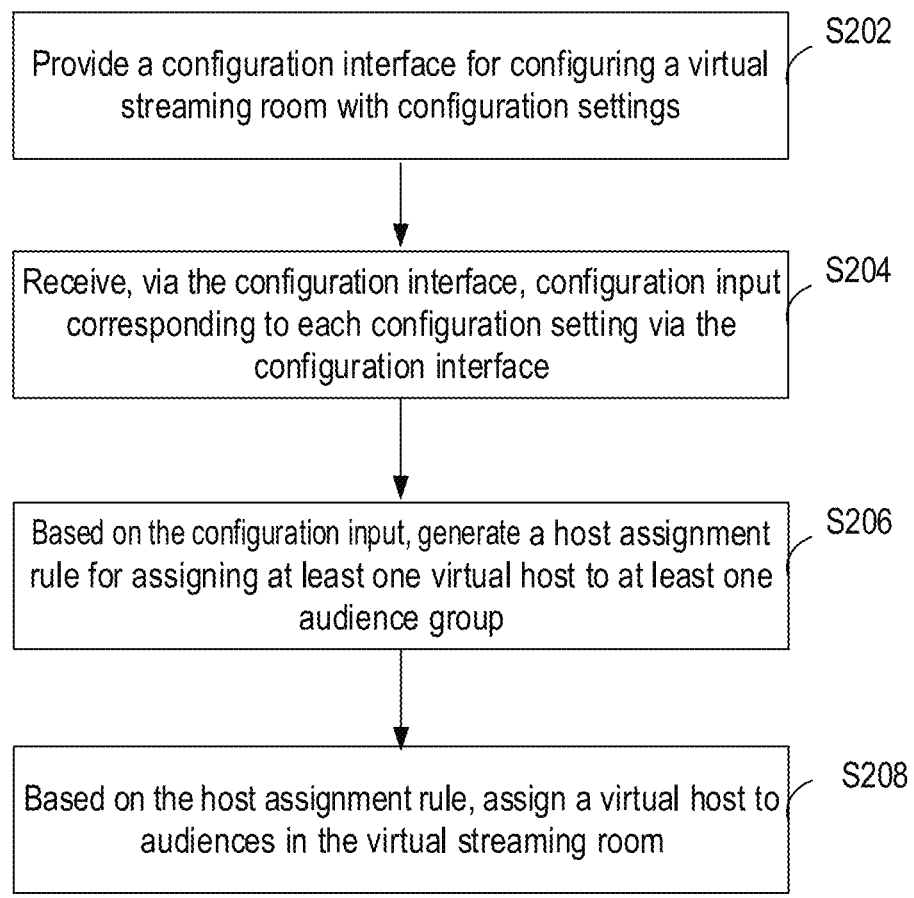
FIG. 2A is a flow diagram illustrating a method for managing virtual streaming according to some of the example embodiments.

FIG. 2A is a flow diagram illustrating a method for managing virtual streaming according some of the example embodiments. In an embodiment, the method for managing virtual streaming according to this embodiment includes the following steps.

In step S202, the method can include providing a configuration interface for configuring a virtual streaming room with configuration settings.

In an embodiment, the configuration settings including at least an audience group setting, and a host setting related to a virtual host.

In an embodiment, a case in which the configuration interface includes a plurality of sub-interfaces for performing different settings is used as an example to describe inputting of configuration input that can be performed via the configuration interface. However, those skilled in the art should understand that in practical applications, a specific implementation of the configuration interface may be configured by those skilled in the art based on actual requirements, and that one configuration interface may also be used to achieve various settings. This is not limited by the example embodiments.

Figure 2B:
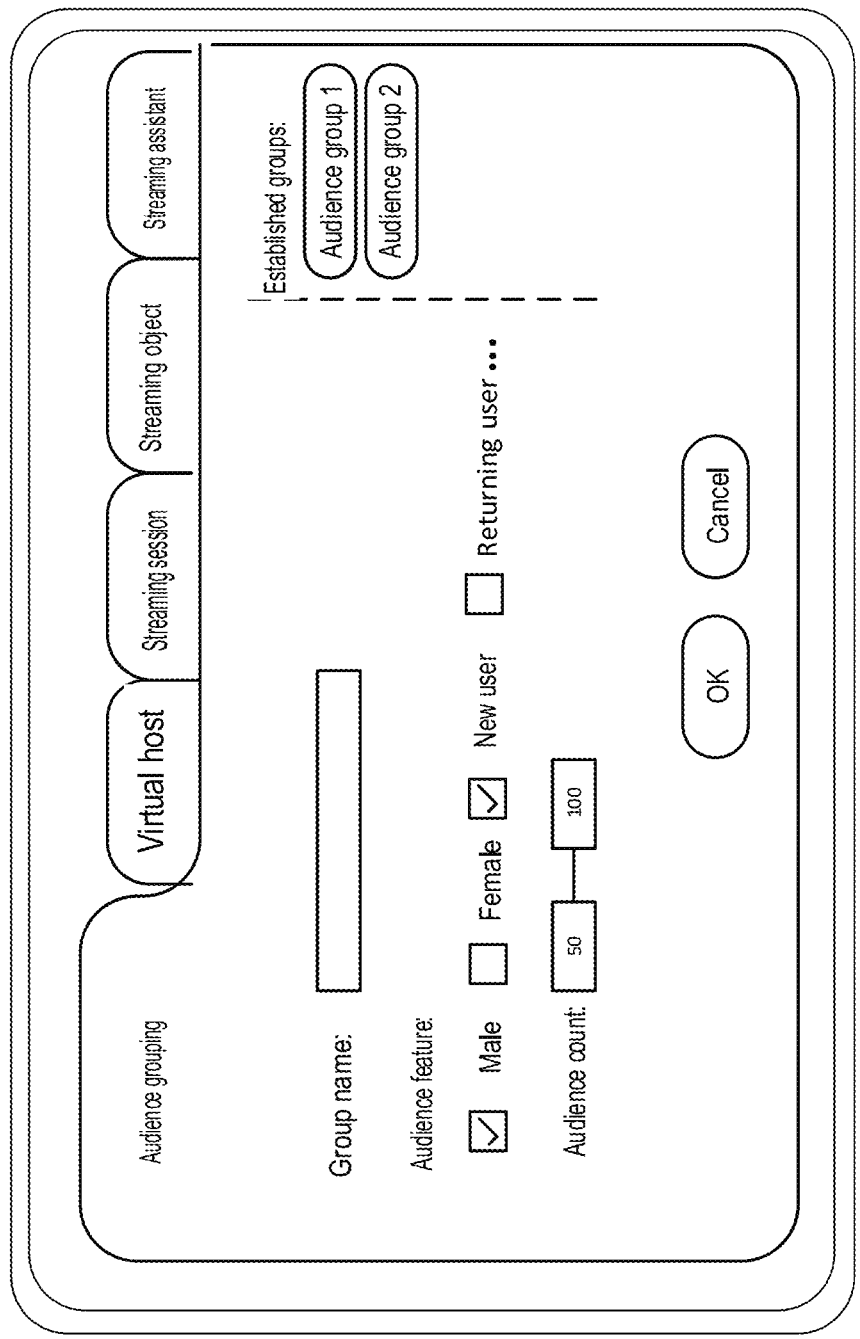
FIG. 2B is a block diagram of an audience group setting sub-interface in a configuration interface according to some of the example embodiments.

As shown in FIG. 2B, a first sub-interface in the configuration interface is an audience grouping sub-interface for performing audience group setting. This sub-interface includes a setting for performing group name setting, a setting for performing group audience feature setting, and a setting for performing group audience count setting. An audience feature may be pre-configured and pre-stored, and may be selected by clicking on the setting; alternatively, the audience feature may be obtained by performing feature analysis on a candidate audience, and then be displayed, and may be selected by clicking on the setting, etc. In FIG. 2B, the setting is illustrated as a plurality of candidate items, and an audience feature setting can be set by checking the same. The setting corresponding to the group audience count setting may be an input box, as shown in FIG. 2B. However, the present application is not limited thereto. A plurality of count ranges may also be pre-configured, and a required data range may be selected from the plurality of count ranges. For example, the count range can be configured as 1-10 persons, 20-30 persons, 100 persons or more, etc. The example embodiments do not limit this specific configuration. As described above, a plurality of audience groups may be provided. The right side of the dotted line in FIG. 2B is a group name of an audience group having been set. When an icon of the group name is clicked on, detailed information of this audience group, namely setting information of setting previously performed for this audience group, is displayed.

Figure 2C:
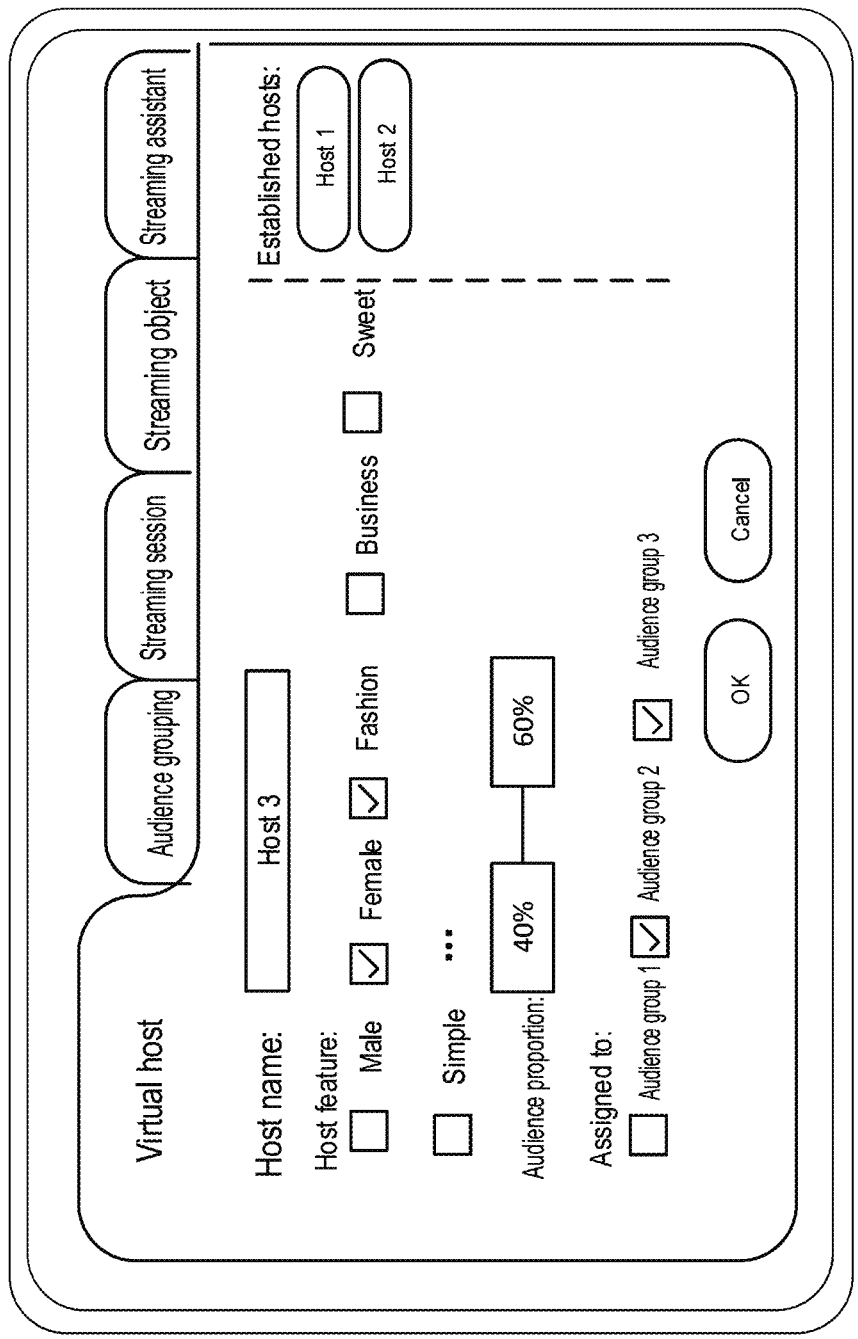
FIG. 2C is a block diagram of a host setting sub-interface in a configuration interface according to some of the example embodiments.

In this embodiment, a second sub-interface in the configuration interface is a sub-interface for performing host setting related to a virtual host. This sub-interface includes a setting for performing host feature setting and a setting for performing audience proportion setting corresponding to a host. A host feature may also be pre-configured and selected by clicking on the setting. Feature analysis may also be performed on a plurality of virtual hosts provided and then features of the virtual hosts may be displayed for selection. An example is shown in FIG. 2C. The interface shown in FIG. 2C displays a plurality of host features of a virtual host in the form of checkboxes. The audience proportion setting corresponding to the host is also similar to the group audience count setting and may be set by user input. Alternatively, or in conjunction with the foregoing, it can also be set by selection from a plurality of count ranges. In addition, a recommended audience proportion setting may also be displayed based on a historical audience count and streaming effect of a certain virtual host. For example, female audiences accounting for 70% and male audiences accounting for 30% may be recommended. In addition, the interface shown in FIG. 2C further includes a setting for performing host assignment, namely the "assigned to" option shown in FIG. 2C. In the figure, three audience groups are used as an example, and a virtual host currently set is assigned to "Audience Group 1." Information of the audience group may be from the settings of the interface shown in FIG. 2B. If the audience group has not been set, then audience group information corresponding to this option may be null. In addition, a plurality of virtual hosts can be provided. The right side of the dotted line in FIG. 2C is a host name of a virtual host having been set. When an icon of the host name is clicked on, detailed information of this virtual host (e.g., setting information of settings previously set for this virtual host) is displayed.

Optionally, the sub-interface for host setting related to a virtual host may further include a setting for at least one of the following settings, namely, a setting for host script setting, a setting for host image setting, and a setting for host voice setting (not illustrated in FIG. 2C). In an embodiment, the above three settings may all be implemented by pre-configuring corresponding data for selection, and a user may input configuration input by selecting dropdown options or checking checkbox options. For example, the setting for host script setting includes scripts 1, 2, and 3. The setting for host image setting can include a clothing setting, a facial image setting, a body image setting, a body action setting, and an auxiliary prop setting, and a plurality of items are provided in each option for selection. The setting for host voice setting can include a sound type setting (e.g., sweet, sunny, hoarse, magnetic, etc.), and the user can implement corresponding setting by performing clicking or drop-down selection.

Although the above settings can meet basic requirements for configuring a streaming room, to further improve an effect of virtual streaming, to meet different streaming requirements, and to improve streaming adherence, the configuration interface may further include one or more of the following sub-interfaces.

(1) Virtual Host Character Setting Sub-Interface

This setting can be used to set a character for a virtual host, such as a housewife character, a salesperson character, an experiencer character, etc., so that in subsequent streaming, the virtual host can perform, based on the set character, streaming in a style matching the character.

(2) Virtual Host Broadcasting Style Setting Sub-Interface

This setting can be used to set a broadcasting style for the virtual host, such as a news broadcasting style, an entertainment program broadcasting style, etc. In practical applications sub-interfaces (1) and (2) may also be combined with the aforementioned host setting sub-interface or may also be set separately. If combined with the host setting sub-interface, the corresponding settings are set in the host setting sub-interface.

(3) Streaming Session Setting Sub-Interface

Figure 2D:
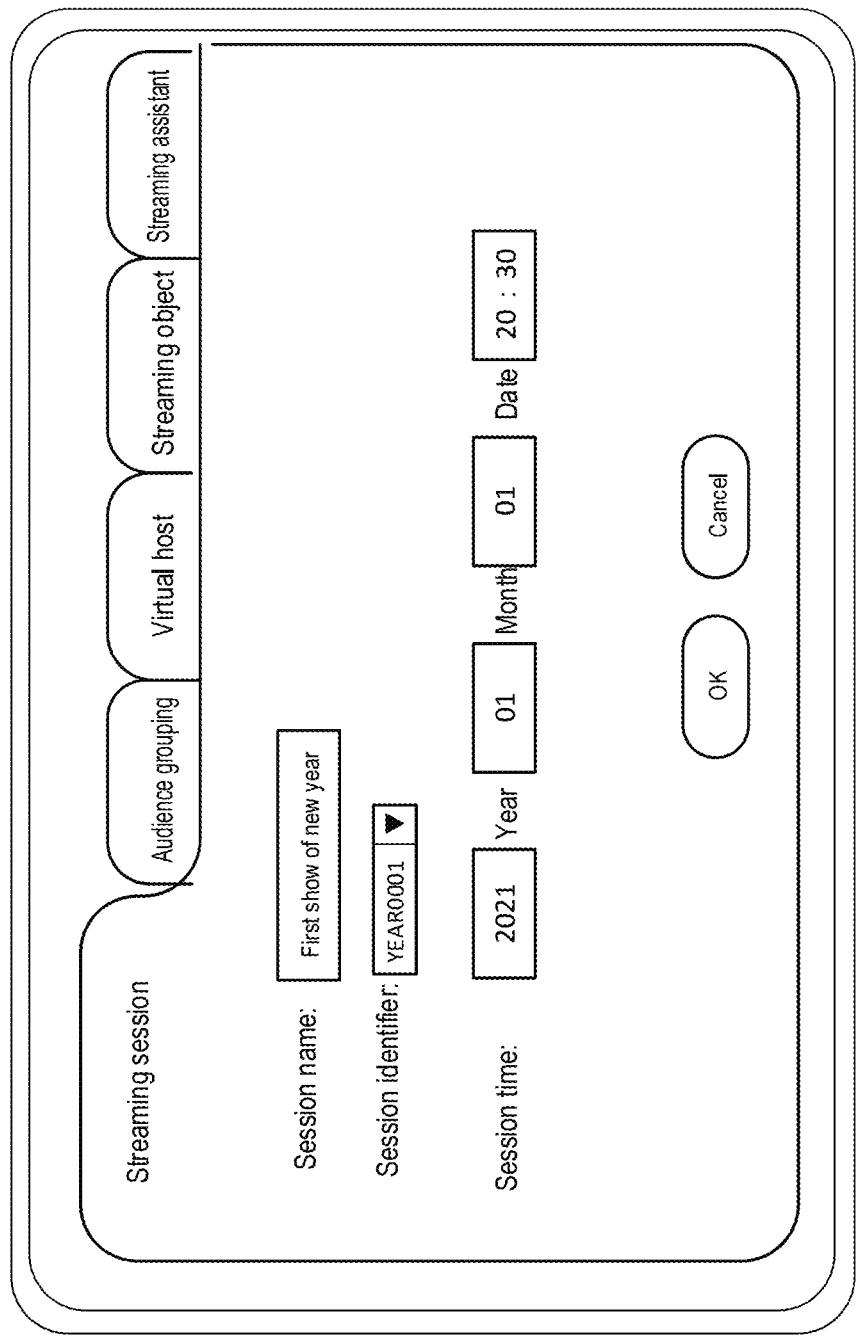
FIG. 2D is a block diagram of a streaming session configuration interface within a configuration interface according to some of the example embodiments.

Streaming may be performed in different sessions and different time periods. Therefore, the configuration interface may further include a streaming session sub-interface to set a streaming session. In this sub-interface, settings such as session identifier or name setting, session time setting, etc. may be performed, as shown in FIG. 2D.

(4) Streaming Object Setting Sub-Interface

Figure 2E:
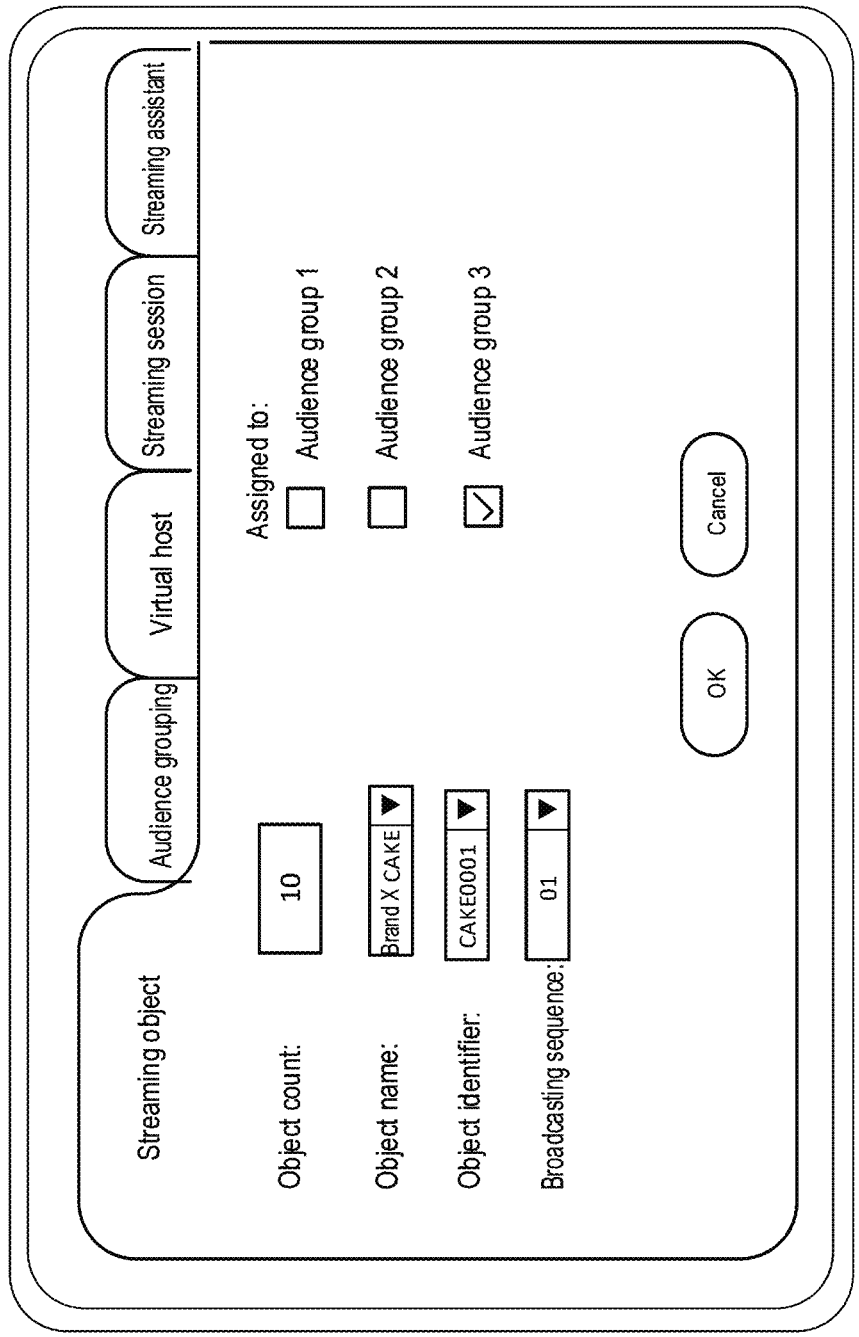
FIG. 2E is a block diagram of a streaming object configuration interface within a configuration interface according to some of the example embodiments.

This sub-interface may include a streaming object name or identifier setting, a streaming object count setting, a streaming object broadcasting sequence setting, etc., as shown in FIG. 2E. In some embodiments, a downward arrow may be clicked on to display a drop-down menu and a corresponding item may be selected from the drop-down menu by means of clicking. In some embodiments, a setting for assigning a streaming object to a corresponding audience group may also be provided in this sub-interface. As shown in FIG. 2E, the set streaming object is assigned to "Audience Group 3."

(5) Streaming Assistant Setting Sub-Interface

Figure 2F:
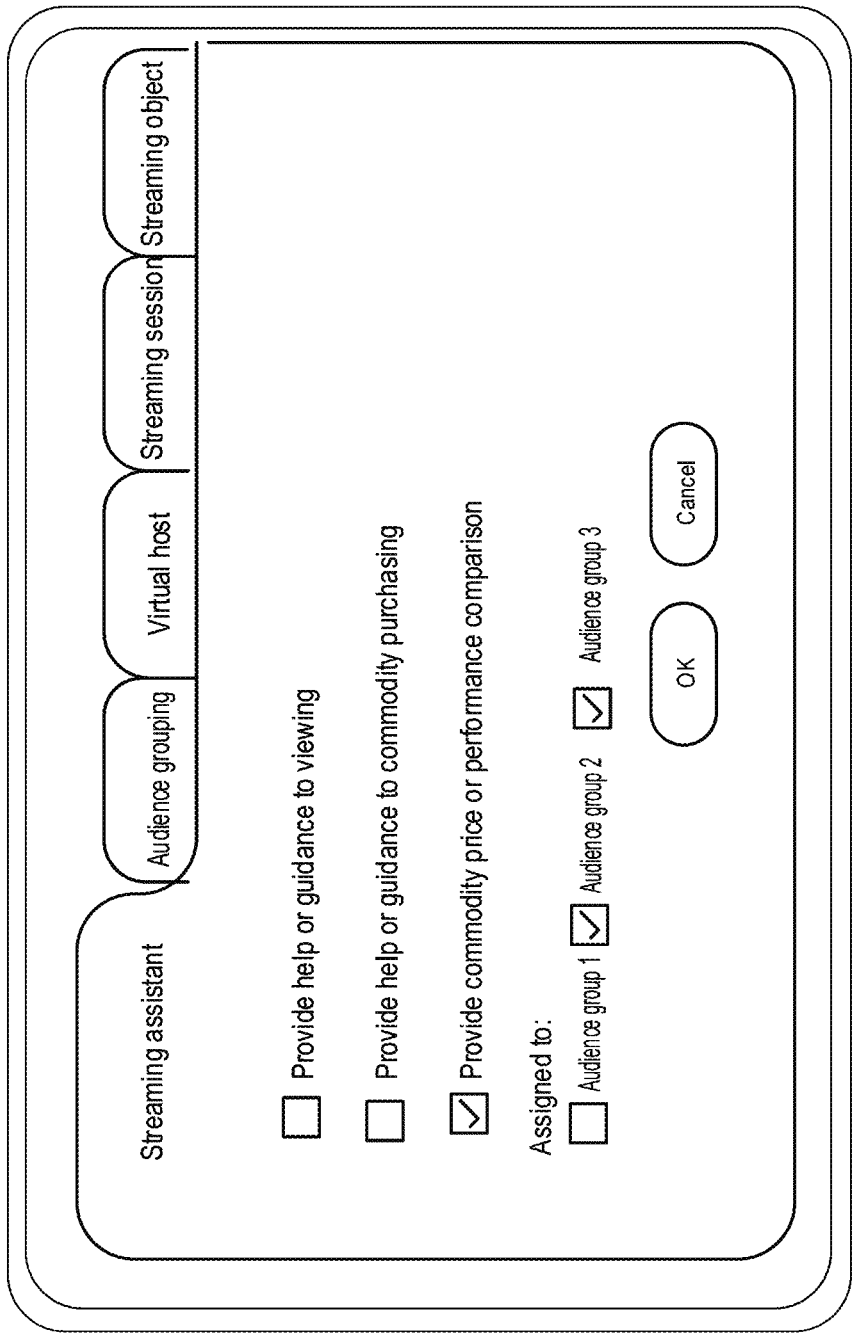
FIG. 2F is a block diagram of a streaming assistant configuration interface within a configuration interface according to some of the example embodiments.

This sub-interface can display information of a corresponding streaming assistant, such as description of functions that can be achieved by the streaming assistant (e.g., providing price or performance comparison of identical commodities, providing help or guidance to streaming viewing performed by a user, providing guidance to commodity purchasing performed by the user, and other description of functions) and provide corresponding settings, such as a check option and so on. The user performing checking indicates that a streaming assistant should be used, while a user not performing checking indicates that the streaming assistant is not used, as shown in FIG. 2F. In some embodiments, a setting for assigning a streaming assistant to a corresponding audience group may also be provided in this sub-interface. As shown in FIG. 2F, streaming assistants capable of providing commodity price or performance comparison are assigned to "Audience Group 2" and "Audience Group 3."

The aforementioned plurality of interfaces and sub-interfaces provide various settings for the virtual streaming and improve the flexibility and the applicability of the virtual streaming. In addition, it should be noted that data transmission and retrieval between a plurality of interfaces, such as the audience group information in a virtual host setting sub-interface is obtained from an audience group setting sub-interface and so on, can be achieved by those skilled in the art by using an appropriate means, and this is not limited by the example embodiments.

In step S204, the method can include receiving configuration input corresponding to each configuration setting via the configuration interface. For example, at least configuration input corresponding to the audience group setting and/or the host setting may be received via the configuration interface.

However, as described in step S202, the configuration interface provided in this embodiment includes a plurality of different sub-interfaces and the user can optionally select settings based on actual requirements.

For example, based on a plurality of candidate virtual hosts provided, a user selection corresponding to one of the virtual hosts may be received, information of this virtual host may be displayed via the configuration interface, and a character setting corresponding to this virtual host may be received via the configuration interface. For example, the host setting sub-interface can be used to perform selection input of virtual hosts. If this sub-interface further has a setting for virtual host character setting, then this option can be used to receive a character setting for the virtual host. Certainly, if the virtual host character setting sub-interface is an independent interface, then the character setting for the virtual host may be received via this independent interface.

For another example, information of the assigned virtual host may be displayed via the configuration interface and a broadcasting style may be set for the virtual host via the configuration interface. If the host setting sub-interface includes a setting for broadcasting style setting, then the configuration input may be received via this sub-interface. If the virtual host broadcasting style setting sub-interface is an independent interface, then a broadcasting style setting for the virtual host may be received via this independent interface. Via this setting, the virtual host can be subsequently controlled to perform virtual streaming according to the set broadcasting style during a streaming process.

As another example, configuration input corresponding to at least one streaming session may be received via the configuration interface. Specifically, this configuration input may be received via the aforementioned streaming session setting sub-interface.

In addition, based on an audience feature of each audience group and/or a host feature of a virtual host corresponding to each audience group, a streaming assistant setting corresponding to each audience group may also be received via the configuration interface, so that the streaming assistant performs auxiliary streaming operation on the virtual host corresponding to each audience group. For example, the aforementioned streaming assistant setting sub-interface is used to input the configuration input.

For another example, based on each audience group and audience feature and/or a host feature of the virtual host corresponding to each audience group, a streaming object setting corresponding to each audience group may also be received via the configuration interface, so that the virtual host corresponding to each audience group performs virtual streaming of the streaming object. For example, the aforementioned streaming object setting sub-interface is used to input the configuration input.

Therefore, the aforementioned various settings and various sub-interfaces provide a convenient and flexible streaming configuration method for the user.

In step S206, based on the configuration input, the method can include generating a host assignment rule for assigning at least one virtual host to at least one audience group.

After inputting the corresponding configuration input in the aforementioned various sub-interfaces, setting information is recorded, and a corresponding host assignment rule is generated based on the specific configuration input.

If character setting has been performed for the virtual host, then in this step, based on an audience feature of each audience group configured in the audience group setting and the character setting of the virtual host, a matching virtual host may be assigned to each audience group. Different characters cause the virtual host to have different performances relative to the audiences in streaming. Therefore, on the basis of the audience feature and the character setting, a virtual host meeting character expectations of the audiences may be assigned to the audiences.

In addition, if a streaming session has been set, then in this step, based on configuration input corresponding to a group setting and/or a host setting of the streaming session, a host assignment rule corresponding to the streaming session may be generated. Although the virtual host may perform continuous streaming, the audiences prefer to view different virtual hosts in different streaming sessions. Therefore, if a streaming session has been set, then a corresponding host assignment rule may be generated based on this, or a corresponding host assignment rule may also be generated based on a combination of the streaming session and the host setting to assign a virtual host to the audiences.

Specifically, regarding generation of the host assignment rule based on the configuration input, in an embodiment, based on the configuration input corresponding to the audience group setting and the host setting, a host feature of each virtual host in a plurality of configured virtual hosts and an audience feature of each audience group in a plurality of configured audience groups may be obtained, and a matching virtual host may be assigned to each audience group based on at least the host feature and the audience feature. Since the host feature can indicate characteristics of the virtual host, and the audience feature can indicate characteristics of the audience, a better effect can be obtained when the two have a relatively high degree of matching. On this basis, by using this method, the effect of assigning, at a high probability, to the audiences a virtual host meeting audience preference can be achieved.

In an embodiment, the host feature may further include at least a view count feature or a viewer count feature of the virtual host. Based on this, the acceptability or the popularity of the virtual host can be determined, and the audience preferences can be learned.

In addition, in another feasible method, before assigning the matching virtual host to each audience group based on at least the host feature and the audience feature, an object feature of a streaming object may also be obtained. Therefore, factors of the streaming object are also comprehensively considered in the process of assigning a virtual host to the audiences, thereby further improving the experience of streaming viewing performed by the audience and improving streaming adherence. In this case, assigning the matching virtual host to each audience group based on at least the host feature and the audience feature includes determining a host feature and an object feature matching the audience feature and assigning to each audience group a virtual host corresponding to the determined host feature and a streaming object corresponding to the determined object feature, so the streaming object is streamed to the audience group via the virtual host.

The above are overall principles or consideration factors that can be used during assignment of a virtual host. Specifically, the host assignment rule generated based on the configuration input may include based on the audience group setting, assigning at least two virtual hosts to each group in a plurality of audience groups; or based on the audience group setting, respectively assigning different virtual hosts to a plurality of audience groups; or based on the audience group setting, assigning the same virtual host to a portion of audience groups, and assigning different virtual hosts to other audience groups. Therefore, the virtual hosts can be flexibly assigned.

For example, if the audience group setting is configured to have three audience groups, then in a method, at least two virtual hosts may be assigned to each group; alternatively, for one or two of the groups, at least two virtual hosts may be assigned to each group, and one virtual host is assigned to each of other groups; in another method, one virtual host may be assigned to each group; in still another method, the same virtual host may be assigned to two of the groups, and another virtual host is assigned to the other group, etc. Therefore, the hosts can be flexibly assigned.

Regarding assigning at least two virtual hosts to each group in a plurality of audience groups, for each group in the plurality of audience groups, at least two virtual hosts may be assigned to the group based on a pre-configured traffic assignment rule. The traffic assignment rule can be appropriately configured by those skilled in the art based on actual requirements; for example, assignment is performed in a ratio of five to five, or assignment is performed in a ratio of six to four, etc. By this means, different virtual hosts use different traffic, including but not limited to network data transmission traffic, order traffic, interaction traffic, etc., to achieve diversified streaming and even diversified interactions between the virtual hosts, thereby enriching virtual streaming forms.

In step S208, based on the host assignment rule, the method can include assigning a virtual host to audiences in the virtual streaming room.

After the host assignment rule is determined, a virtual host can be assigned to the audiences of each audience group based on the rule. Therefore, the audiences can view streaming of the virtual host via the virtual streaming room.

According to this embodiment, firstly, a configuration interface for configuring a virtual streaming room is provided, and an audience group setting and a virtual host setting can be inputted via the configuration interface based on actual streaming requirements. Then, a corresponding host assignment rule can be generated based on these settings, and the host assignment rule can guide subsequent assignment of virtual hosts. On this basis, on the one hand, audience grouping can be performed based on features of audiences to view streaming to provide, in a targeted manner, virtual hosts matching different audience groups to meet features and requirements of different audiences. On the other hand, the virtual hosts can be assigned based on different features of the virtual hosts, so that a virtual host better matches an audience and a virtual streaming room, and that assignment flexibility is higher. Therefore, a streaming effect of the virtual streaming room is greatly improved, and audience adherence is also improved. Therefore, the schemes according to the example embodiments solve the problems in which the form of an existing virtual host is fixed, audience adhesion is poor, and use thereof is inflexible.

The method for managing virtual streaming according to this embodiment may be executed by any appropriate electronic device having data processing capabilities, including but not limited to a server, a mobile terminal (e.g., a mobile phone, a tablet, etc.), a personal computer, etc.

Figure 3A:
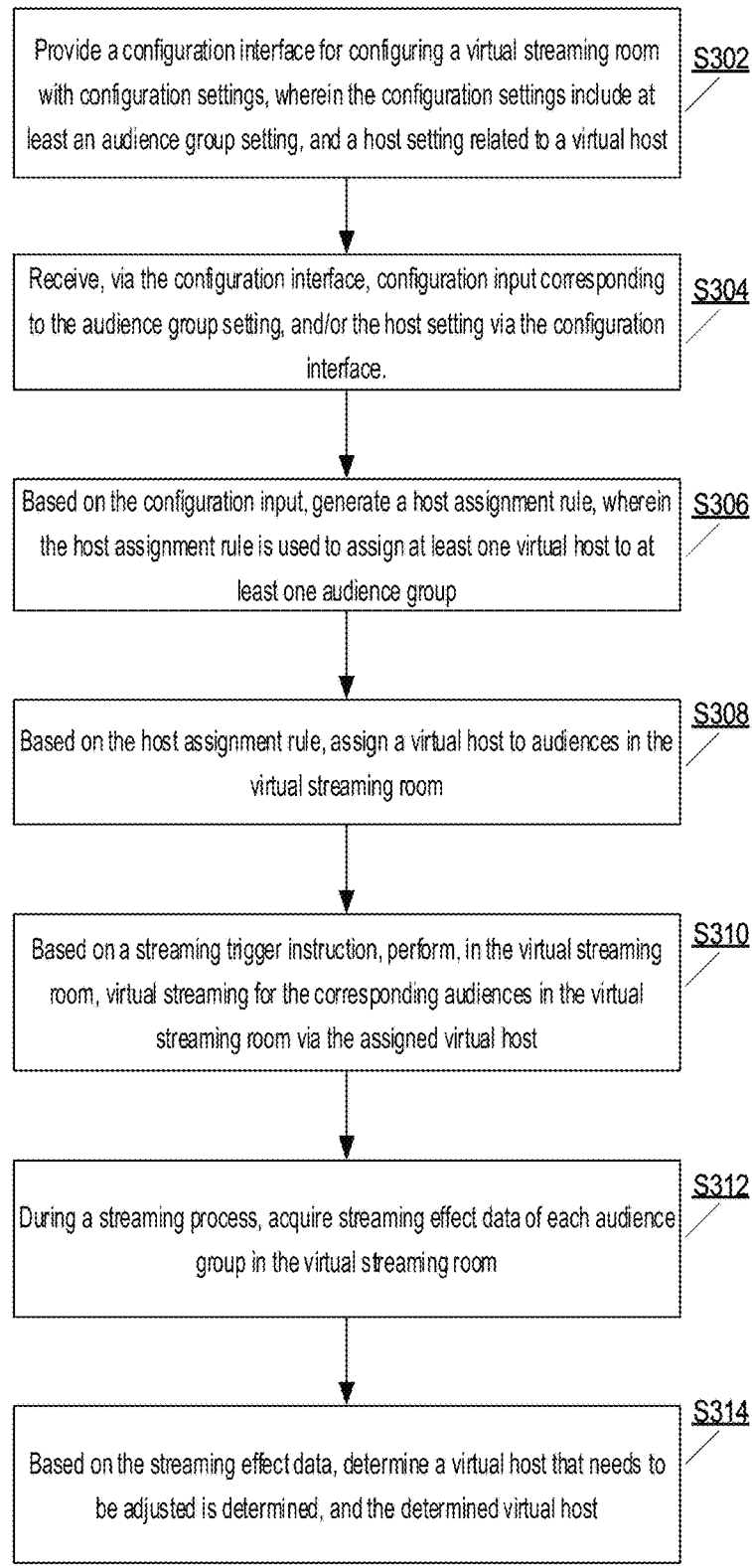
FIG. 3A is a flow diagram illustrating a method for managing virtual streaming according to some of the example embodiments.

FIG. 3A is a flow diagram illustrating a method for managing virtual streaming according to some of the example embodiments. This embodiment focuses on acquisition of streaming effect data and adjustment of a virtual host performed based on the data. The method for managing virtual streaming according to this embodiment includes the following steps.

In step S302, the method can include providing a configuration interface for configuring a virtual streaming room with configuration settings, wherein the configuration settings include at least an audience group setting, and a host setting related to a virtual host.

In step S304, the method can include receiving configuration input corresponding to the audience group setting, and/or the host setting via the configuration interface.

In step S306, the method can include generating, based on the configuration input, a host assignment rule, wherein the host assignment rule is used to assign at least one virtual host to at least one audience group.

In step S308, the method can include assigning, based on the host assignment rule, a virtual host to audiences in the virtual streaming room.

For specific implementations of aforementioned steps S302 through S308, references can be made to related description in aforementioned embodiments, and details will not be described herein again.

In step S310, the method can include performing, based on a streaming trigger instruction, virtual streaming for the corresponding audiences in the virtual streaming room via the assigned virtual host.

The streaming trigger instruction may be any appropriate instruction generated by a trigger condition that can trigger a virtual host to perform a streaming activity and the instruction may be in the form of a message or an electrical signal. The trigger condition can be appropriately configured by those skilled in the art based on actual requirements. For example, upon receiving that an audience enters the streaming room, a host is correspondingly assigned to the audience, a configured streaming starting time arrives, a streaming button in the interface is clicked on, etc.

In an example, if Virtual Host 1 is assigned to audience group A, and Virtual Host 2 is assigned to Audience Group B, then in a terminal corresponding to audiences of Audience Group A, streaming is performed in the virtual streaming room via Virtual Host 1, while in a terminal corresponding to audiences of Audience Group B, streaming is performed in the virtual streaming room via Virtual Host 2.

In step S312, the method can include acquiring, during a streaming process, streaming effect data of each audience group in the virtual streaming room.

The streaming effect data includes at least one of the following viewer count data, average viewing duration data, viewing interaction rate data, streaming task completion count and/or proportion data, and average completed streaming task earnings data. These pieces of streaming effect data can reflect a streaming effect of the virtual host and audience feedback, so that the same can serve as a basis for subsequent adjustments to the virtual host.

The viewer count data can be determined by counting the actual number of online users. The average viewing duration data can be determined by performing a statistical operation on actual viewing duration of the actual number of online users and then averaging the result. A viewing interaction rate is used to indicate an interaction between the audience and the virtual host, such as the audience sending a message to the virtual host, giving a like, giving a gift, placing an order, etc., and a ratio of the number of these audiences having performed interaction operation to the total number of audiences in an audience group in which these audiences are located can be used as the viewing interaction rate data. The streaming task completion data and/or proportion data is related to actual streaming; in an e-commerce streaming scene, this data may be the number of orders placed and/or a ratio of the number of audiences having placed an order to the total number of audiences in a group in which these audiences are located, and in other scenes, this data may be the number and/or proportion of other tasks completed. The average completed streaming task earnings data is also related to actual streaming, and in the e-commerce streaming scene, the average completed streaming task earnings data may be order earnings.

In step S314, the method can include dynamically adjusting, based on the streaming effect data, a virtual host that needs to be adjusted is determined, and the determined virtual host.

For example, based on the streaming effect data, it may be determined whether a virtual host is accepted by audiences of an audience group in which the virtual host is located and whether the virtual host conforms to preferences of the audiences of the audience group in which the virtual host is located. In specific evaluation, a pre-configured evaluation algorithm or threshold may be used to perform evaluation to determine whether the virtual host needs to be adjusted. The evaluation algorithm or threshold can be appropriately configured by those skilled in the art according to actual requirements and is not limited by the example embodiments.

If it is determined that a certain virtual host needs to be adjusted, then at least one of the following methods can be used to perform dynamic adjustment: performing audience assignment proportion adjustment on the virtual host; performing host script adjustment on the virtual host; performing adjustment by replacing the original virtual host with a new virtual host; performing adjustment by switching between virtual hosts of different audience groups or between virtual hosts of different virtual streaming rooms; and performing host image adjustment and/or voice adjustment on the virtual host. By adjusting the virtual host, audience feelings can be tracked in a timely manner, thereby meeting the requirements of the audience, and improving the effect of virtual streaming. In one embodiment of the above adjustment, certain adjustment rules can be set for the adjustment. For example, adjustments can be performed in order, such as firstly adjusting the host image. If streaming effect data acquired with respect to the adjusted host image indicates that adjustment is still needed, then the host voice may further be adjusted. If streaming effect data acquired after the voice adjustment indicates that an adjustment effect is relatively good, then the adjustment can be suspended. Otherwise, corresponding adjustment continues, such as adjusting a host script, or adjusting the host image or voice again, etc. However, the present application is not limited thereto. Multiple adjustments may also be performed at one time, such as simultaneously adjusting the image, the voice, the script, etc. of the virtual host in one adjustment. A specific adjustment policy can be appropriately configured by those skilled in the art, and the adjustment policy should meet actual streaming requirements and result in a satisfactory streaming effect.

In an embodiment, to further improve audience experience and improve degree of participation of audiences in streaming, performing adjustment by switching between virtual hosts of different audience groups or between virtual hosts of different virtual streaming rooms may be implemented as receiving a host switching request from a streaming audience; based on the host switching request, determining a virtual host to which the streaming audience needs to switch; and switching from a current virtual host corresponding to the streaming audience to the determined virtual host. Therefore, the audience can select a time to perform host switching and a host to switch to.

In addition, it should be noted that after streaming ends, a statistical operation and analysis may further be performed on the acquired streaming effect data to provide an effective data reference for subsequent various processes such as processing performed on the virtual host and the audience group.

Figure 3B:
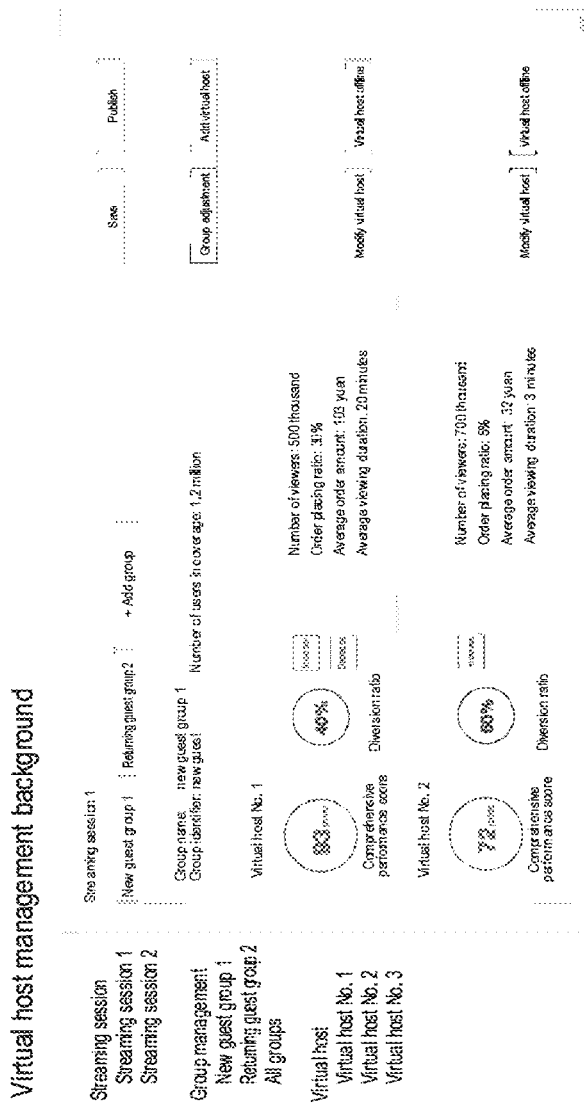
FIG. 3B is a block diagram of a virtual host adjustment interface according to some of the example embodiments.

In the following, an e-commerce streaming scene is used as an example to illustratively describe the aforementioned process for virtual host adjustment, as shown in FIG. 3B. FIG. 3B shows an adjustment interface of a virtual host of this example.

It can be learned from FIG. 3B that in this example, an audience group "New Guest Group 1" of Streaming Session 1 is provided with two virtual hosts, namely "Virtual Host No. 1" and "Virtual Host No. 2"; it is assumed that on the basis of streaming effect data, it is determined that the comprehensive performance score of "Virtual Host No. 1" is 93 points and the comprehensive performance score of "Virtual Host No. 2" is 72 points, and if a score threshold is set to be 85 points, then "Virtual Host No. 2" needs to be adjusted. For example, "Virtual Host No. 2" may be put offline via a "Virtual Host Offline" button in FIG. 3B, and then a new virtual host may be selected to perform subsequent streaming. Alternatively, an image, a voice, a script, etc. of "Virtual Host No. 2" may be adjusted via a "Virtual Host Modification" button to meet requirements of audiences in "New Guest Group 1". Optionally, in this example, an audience diversion ratio of "Virtual Host No. 2" may also be adjusted via an "Increase" or "Decrease" button; for example, "Decrease" adjustment may be performed on "Virtual Host No. 2", and "Increase" adjustment may be performed on "Virtual Host No. 1".

In addition to solving the problems in which the form of an existing virtual host is fixed, audience adhesion is poor, and use thereof is inflexible, this embodiment can further track streaming viewing experience of the audiences in real time based on the streaming effect data and optimize and adjust the virtual host in a timely manner to better meet the requirements of the audiences and improve the streaming effect.

The method for managing virtual streaming according to this embodiment may be executed by any appropriate electronic device having data processing capabilities, including but not limited to a server, a mobile terminal (e.g., a mobile phone, a tablet, etc.), a personal computer, etc.

Figure 4A:
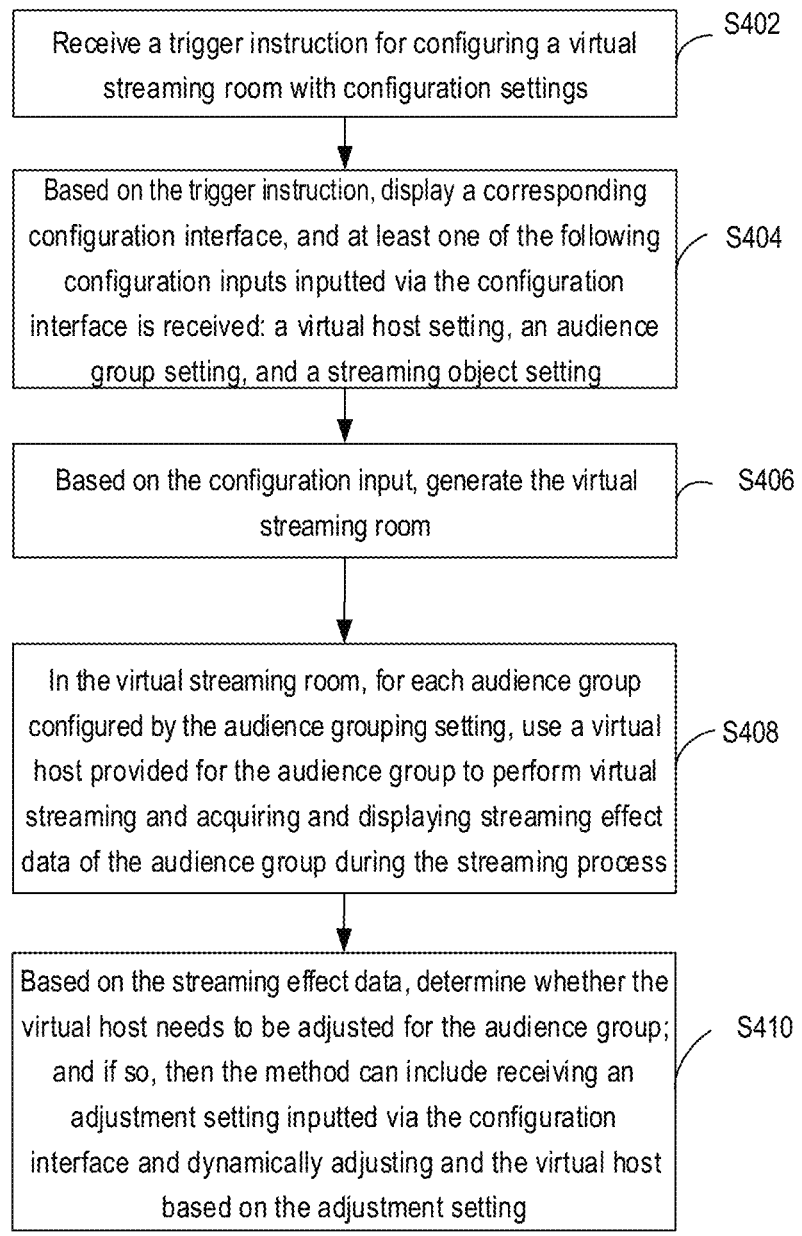
FIG. 4A is a flow diagram illustrating a method for managing virtual streaming according to some of the example embodiments.

FIG. 4A is a flow diagram illustrating a method for managing virtual streaming according to some of the example embodiments. The method for managing virtual streaming according to this embodiment includes the following steps.

In step S402, the method can include receiving a trigger instruction for configuring a virtual streaming room with configuration settings.

The trigger instruction may be implemented in the form of, for example, a message or an electrical signal. In practical applications, a user may trigger the configuration settings and generate the trigger instruction by clicking on a corresponding setting displayed on an interface. For example, the user may click on an application displayed on the interface for performing the configuration settings to enter the application to perform the configuration settings. Alternatively, the user may click on a certain button in a display interface of the application for instructing to configure the virtual streaming room with configuration settings to enter a corresponding interface to perform configuration settings, etc. This is not limited by the example embodiments.

In step S404, the method can include displaying, based on the trigger instruction, a corresponding configuration interface, and at least one of the following configuration inputs inputted via the configuration interface is received: a virtual host setting, an audience group setting, and a streaming object setting.

Figure 4B:
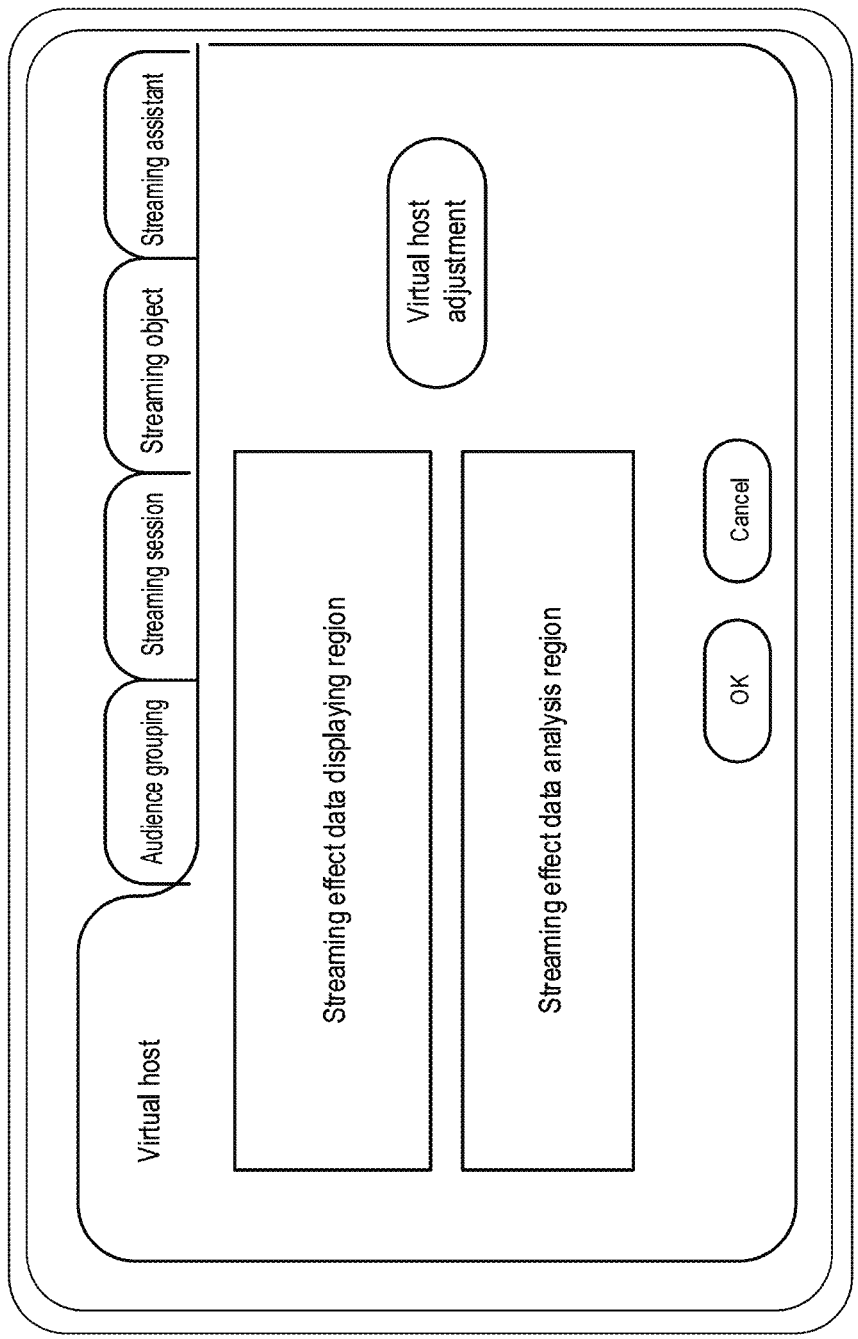
FIG. 4B is a block diagram of a virtual host setting sub-interface for adjustment according to some of the example embodiments.

In an embodiment, receiving the virtual host setting inputted via the configuration interface includes receiving the virtual host setting inputted via a virtual host setting sub-interface in the configuration interface, the virtual host setting including at least one of the following: a virtual host adjustment setting, a streaming effect data displaying setting for the virtual host, and a streaming effect data analysis setting for the virtual host. Different from the interface for virtual host setting in FIG. 2C described above, the interface in this embodiment needs to have a setting for reflecting a streaming effect and a setting for adjusting the virtual host. Certainly, in an embodiment, the virtual host adjustment setting, the streaming effect data displaying setting for the virtual host, the streaming effect data analysis setting for the virtual host, etc. may also be provided in the interface mainly for initial setting in FIG. 2C described above. However, optionally, the virtual host setting sub-interface corresponding to adjustment may also be provided separately. In other words, during a streaming process, interface content of the virtual host setting sub-interface changes from the interface in FIG. 2C to an interface shown in FIG. 4B. In FIG. 4B, after a "virtual host adjustment" icon is clicked on, corresponding adjustment options are displayed, the adjustment options including but not limited to character adjustment, image adjustment, voice adjustment, script adjustment, body action adjustment, broadcasting style adjustment, etc. More detailed adjustments are provided in each adjustment option; for example, the character adjustment may have a housewife character, a salesperson character, an experiencer character, etc.; for example, if an original character is a "salesperson character," then it may be modified to a "housewife character." Each of the above adjustment options can be selected by a user via a drop-down menu, a radio button, etc. to achieve adjustment.

In another embodiment, receiving the audience group setting inputted via the configuration interface includes receiving a streaming audience setting inputted via a streaming audience setting sub-interface in the configuration interface, the streaming audience setting including at least one of the following: an audience grouping parameter setting, a virtual host setting corresponding to each audience group, a streaming effect data displaying setting corresponding to each audience group, and a streaming effect data analysis setting corresponding to each audience group. Different from the interface for audience group setting in FIG. 2B described above, the interface in this embodiment needs to have a setting for reflecting a streaming effect and a setting for adjusting an audience group and the virtual host corresponding thereto. Certainly, in an embodiment, the audience grouping parameter setting, the virtual host setting corresponding to each audience group, the streaming effect data displaying setting corresponding to each audience group, the streaming effect data analysis setting corresponding to each audience group, etc. may also be provided in the interface mainly for initial setting in FIG. 2B described above. However, optionally, an audience group setting sub-interface corresponding to adjustment may also be provided separately. In other words, during a streaming process, interface content of the audience group setting sub-interface changes from the interface in FIG. 2B to an interface shown in FIG. 4C. In FIG. 4C, regarding the audience grouping parameter adjustment setting, a corresponding adjustment interface can be displayed after a corresponding icon is clicked on; in this interface, adjustment of various parameters can be implemented in a manner similar to that in FIG. 2B, where the parameters include but are not limited to: an audience count, an audience feature, an audience diversion ratio, etc. In addition, regarding the virtual host setting corresponding to each audience group, a corresponding adjustment interface can be displayed after a corresponding icon is clicked on, and in this interface, adjustment of the virtual host can be implemented in a manner similar to that in FIG. 2C.

Figure 4D:
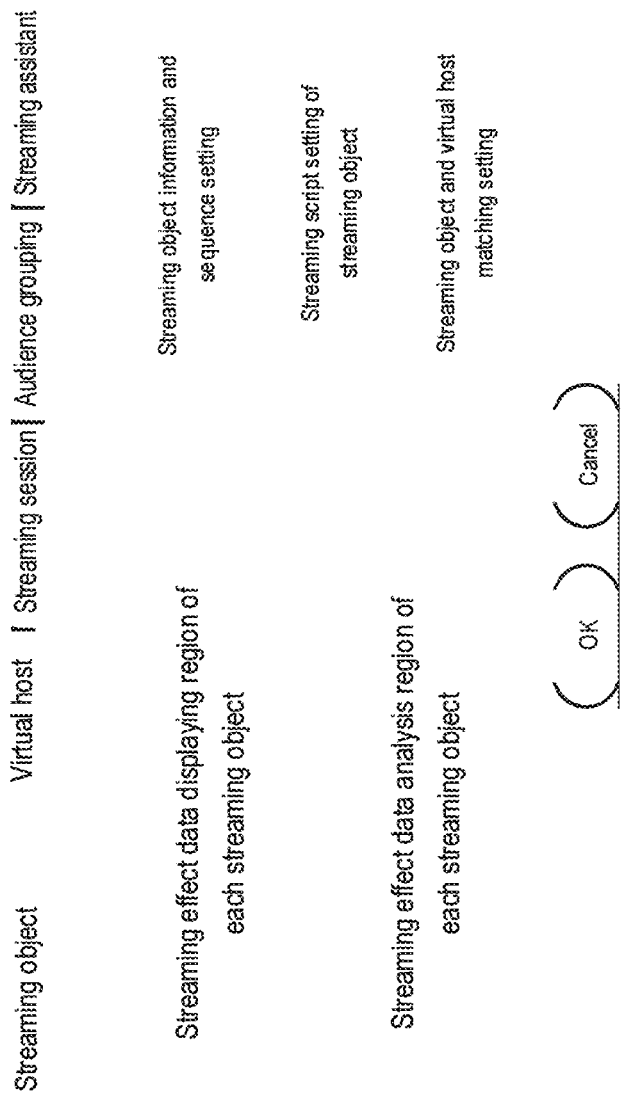
FIG. 4D is a block diagram of a streaming object setting sub-interface for adjustment according to some of the example embodiments.

In another embodiment, receiving the streaming object setting inputted via the configuration interface includes: receiving the streaming object setting inputted via a streaming object setting sub-interface in the configuration interface, the streaming object setting including at least one of the following: a streaming object information and sequence setting, a streaming script setting corresponding to a streaming object, a streaming script and virtual host matching setting, a streaming effect data displaying setting of the streaming object, and a streaming effect data analysis setting of the streaming object. Different from the interface for streaming object setting in FIG. 2E described above, the interface in this embodiment needs to have a setting for reflecting a streaming effect and a setting for adjusting the streaming object. Certainly, in an embodiment, the streaming object information and sequence setting, the streaming script setting corresponding to the streaming object, the streaming script and virtual host matching setting, the streaming effect data displaying setting of the streaming object, the streaming effect data analysis setting of the streaming object, etc. may also be provided in the interface mainly for initial setting in FIG. 2E described above. However, optionally, a streaming object setting sub-interface corresponding to adjustment may also be provided separately. In other words, during a streaming process, interface content of the streaming object setting sub-interface changes from the interface in FIG. 2E to an interface shown in FIG. 4D. In FIG. 4D, regarding the streaming script setting corresponding to the streaming object and the streaming script and virtual host matching setting, a corresponding adjustment interface can be displayed after a corresponding icon is clicked on, and in this interface, a drop-down menu or a radio button can be used to adjust the settings.

In another embodiment, the configuration input further includes: a streaming session setting. For a configuration interface, reference can be made to the settings in FIG. 2D described above.

In step S406, based on the configuration input, the method can include generating a virtual streaming room.

After the aforementioned specific configuration input is inputted, those skilled in the art can refer to a specific virtual streaming room generation method in related technologies to generate a specific virtual streaming room. For example, a pre-configured virtual streaming room architecture is used, and image rendering is performed in a corresponding display interface based on the architecture and the aforementioned configuration input to generate the virtual streaming room. The example embodiments do not limit the specific generation method. In addition, when the configuration input includes the virtual host setting and the audience group setting, the method for managing virtual streaming according to this embodiment may further include the following steps.

In step S408, in the virtual streaming room, for each audience group configured by the audience group setting, the method can include using a virtual host provided for the audience group to perform virtual streaming and acquiring and displaying streaming effect data of the audience group during the streaming process.

The streaming effect data includes at least one of the following: viewer count data, average viewing duration data, viewing interaction rate data, streaming task completion count and/or proportion data, and average completed streaming task earnings data.

In step S410, the method can include determining, based on the streaming effect data, whether the virtual host needs to be adjusted for the audience group; and if so, then the method can include receiving an adjustment setting inputted via the configuration interface and dynamically adjusting and the virtual host based on the adjustment setting.

Receiving the adjustment setting inputted via the configuration interface and dynamically adjusting the virtual host based on the adjustment setting includes at least one of the following: displaying a virtual host adjustment sub-interface in the configuration interface, receiving an adjustment setting inputted via the virtual host adjustment sub-interface, and performing at least one of the following adjustments on the virtual host based on the adjustment setting: performing audience assignment proportion adjustment on the virtual host; performing host script adjustment on the virtual host; performing adjustment by replacing the original virtual host with a new virtual host; switching a virtual host of another audience group or a virtual host of another virtual streaming room to a current audience group; and performing host image adjustment and/or voice adjustment on the virtual host.

For specific implementation of the above steps S408-S410, reference can be made to related description in embodiments described above, and details will not be described herein again.

This embodiment provides a comprehensive streaming room configuration interface so that the virtual streaming room can be flexibly configured. In addition to solving the problems in which the forms of an existing virtual streaming room and virtual host are fixed, audience adhesion is poor, and use thereof is inflexible, this embodiment can further track streaming viewing experience of the audiences in real time based on the streaming effect data and optimize and adjust the virtual host in a timely manner to better meet the requirements of the audiences and improve the streaming effect.

The method for managing virtual streaming according to this embodiment may be executed by any appropriate electronic device that has data processing capabilities, including but not limited to a server, a mobile terminal (e.g., a mobile phone, a tablet, etc.), a personal computer, etc.

Figure 5:
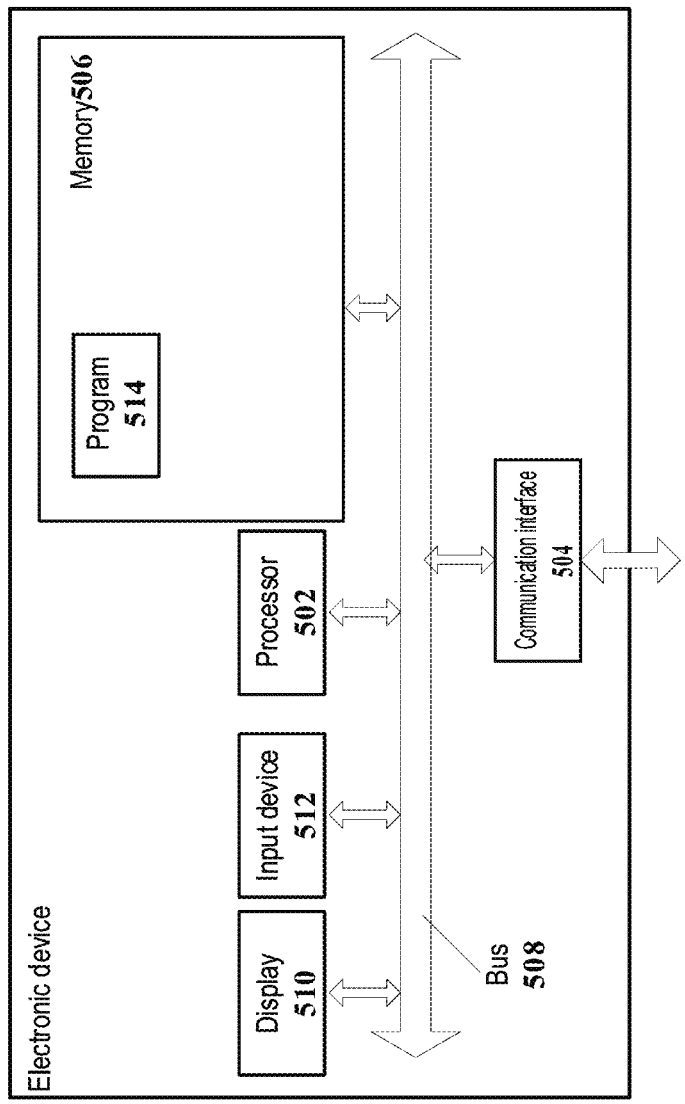
FIG. 5 is a block diagram of an electronic device according to some of the example embodiments.

FIG. 5 is a block diagram of an electronic device according to some of the example embodiments. The specific the example embodiments do not limit specific implementation of the electronic device.

As shown in FIG. 5, the electronic device may include: a processor 502, a communication interface 504, a memory 506, a communication bus 508, a display 510, and an input device 512. In an embodiment, the processor 502, the display 510, the input device 512, the communication interface 504, and the memory 506 communicate with each other via the communication bus 508. The communication interface 504 is used to communicate with other electronic devices or a server. The display 510 is used to display a configuration interface for configuring a virtual streaming room with configuration settings, the configuration settings including at least an audience group setting, and a host setting related to a virtual host. The input device 512 is used to provide configuration input inputted via the configuration interface. The processor 502 is used to execute a program 514 and can specifically execute the related steps in the aforementioned embodiments of method for managing virtual streaming.

Specifically, the program 514 may include program code, and the program code includes computer operation instructions.

The processor 502 may be a central processing unit (CPU) or an application specific integrated circuit (ASIC) or is configured to be one or a plurality of integrated circuits for implementing the example embodiments. The intelligent device includes one or a plurality of processors, which can be processors of the same type, such as one or a plurality of CPUs, and can also be processors of different types, such as one or a plurality of CPUs and one or a plurality of ASICs.

The memory 506 is configured to store the program 514. The memory 506 may include a high-speed RAM, and may also include a non-volatile memory, such as at least one disk memory.

In an embodiment, the program 514 may specifically be configured to cause the processor 502 to perform the operations of providing a configuration interface for configuring a virtual streaming room with configuration settings, the configuration settings including at least an audience group setting, and a host setting related to a virtual host; receiving, via the configuration interface, configuration input corresponding to the audience group setting, and/or the host setting; and based on the configuration input, generating a host assignment rule, the host assignment rule for assigning at least one virtual host to at least one audience group.

In an embodiment, the host assignment rule includes based on the audience group setting, assigning at least two virtual hosts to each group in a plurality of audience groups; or based on the audience group setting, respectively assigning different virtual hosts to a plurality of audience groups; or based on the audience group setting, assigning the same virtual host to a portion of audience groups, and assigning different virtual hosts to other audience groups.

In an embodiment, the program 514 is further configured to cause the processor 502 to, when assigning at least two virtual hosts to each group in a plurality of audience groups: for each group in the plurality of audience groups, assign at least two virtual hosts to the group based on a pre-configured traffic assignment rule.

In an embodiment, the audience group setting includes at least one of the following: a group name setting, a group audience feature setting, and a group audience count setting.

In an embodiment, the host setting includes at least one of the following: a host feature setting, and an audience proportion setting corresponding to a host.

In an embodiment, the host setting further includes at least one of the following: a host script setting, a host image setting, and a host voice setting.

In an embodiment, the program 514 is further configured to cause the processor 502 to, during generating, based on the configuration input, the host assignment rule: based on the configuration input corresponding to the audience group setting and the host setting, obtain a host feature of each virtual host in a plurality of configured virtual hosts and an audience feature of each audience group in a plurality of configured audience groups, and assign a matching virtual host to each audience group based on at least the host feature and the audience feature.

In an embodiment, the program 514 is further configured to cause the processor 502 to, before assigning the matching virtual host to each audience group based on at least the host feature and the audience feature, obtain an object feature of a streaming object, and during assigning the matching virtual host to each audience group based on at least the host feature and the audience feature: determine a host feature and an object feature matching the audience feature; and assign to each audience group a virtual host corresponding to the determined host feature and a streaming object corresponding to the determined object feature, so that the streaming object is streamed to the audience group via the virtual host.

In an embodiment, the host feature includes a view count feature or a viewer count feature of the virtual host.

In an embodiment, the program 514 is further configured to cause the processor 502 to provide a plurality of candidate virtual hosts, receive selection input corresponding to one of the virtual hosts, display information of the virtual host via the configuration interface, and receive, via the configuration interface, a character setting corresponding to the virtual host; the program 514 is further configured to cause the processor 502 to, during generating, based on the configuration input, the host assignment rule: based on an audience feature of each audience group configured in the audience group setting and the character setting of the virtual host, assign a matching virtual host to each audience group.

In an embodiment, the program 514 is further configured to cause the processor 502 to display information of the assigned virtual host via the configuration interface and set a broadcasting style for the virtual host via the configuration interface.

In an embodiment, the program 514 is further configured to cause the processor 502 to control the virtual host to perform virtual streaming according to the set broadcasting style during a streaming process.

In an embodiment, the program 514 is further configured to cause the processor 502 to receive, via the configuration interface, configuration input corresponding to at least one streaming session; the program 514 is further configured to cause the processor 502 to, during generating, based on the configuration input, the host assignment rule: based on configuration input corresponding to a group setting and/or a host setting of the streaming session, generate a host assignment rule corresponding to the streaming session.

In an embodiment, the program 514 is further configured to cause the processor 502 to: based on each audience group and audience feature and/or a host feature of the virtual host corresponding to each audience group, receive, via the configuration interface, a streaming object setting corresponding to each audience group, so that the virtual host corresponding to each audience group performs virtual streaming of the streaming object.

In an embodiment, the program 514 is further configured to cause the processor 502 to: based on an audience feature of each audience group and/or a host feature of the virtual host corresponding to each audience group, receive, via the configuration interface, a streaming assistant setting corresponding to each audience group, so that the streaming assistant performs auxiliary streaming operation on the virtual host corresponding to each audience group.

In an embodiment, the program 514 is further configured to cause the processor 502 to: during a streaming process, acquire streaming effect data of each audience group in the virtual streaming room; based on the streaming effect data, determine a virtual host that needs to be adjusted, and dynamically adjust the determined virtual host.

In an embodiment, the streaming effect data includes at least one of the following: viewer count data, average viewing duration data, viewing interaction rate data, streaming task completion count and/or proportion data, and average completed streaming task earnings data.

In an embodiment, dynamically adjusting the determined virtual host includes at least one of the following: performing audience assignment proportion adjustment on the virtual host; performing host script adjustment on the virtual host; performing adjustment by replacing the original virtual host with a new virtual host; performing adjustment by switching between virtual hosts of different audience groups or between virtual hosts of different virtual streaming rooms; and performing host image adjustment and/or voice adjustment on the virtual host.

In an embodiment, the program 514 is further configured to cause the processor 502 to, while performing adjustment by switching between virtual hosts of different audience groups or between virtual hosts of different virtual streaming rooms: receive a host switching request from a streaming audience; based on the host switching request, determine a virtual host to which the streaming audience needs to switch; and switch from a current virtual host corresponding to the streaming audience to the determined virtual host.

In an embodiment, the program 514 is further configured to cause the processor 502 to, after streaming ends, perform a statistical operation and analysis on the acquired streaming effect data.

In an embodiment, the program 514 is further configured to cause the processor 502 to: based on the host assignment rule, assign a virtual host to audiences in the virtual streaming room.

In another embodiment, the program 514 may specifically be configured to cause the processor 502 to perform the following operations: receiving a trigger instruction for configuring a virtual streaming room with configuration settings; based on the trigger instruction, displaying a corresponding configuration interface, and receiving at least one of the following configuration input inputted via the configuration interface: a virtual host setting, an audience group setting, and a streaming object setting; and based on the configuration input, generating the virtual streaming room.

In an embodiment, the configuration input further includes: a streaming session setting.

In an embodiment, the program 514 is further configured to cause the processor 502 to, when receiving the virtual host setting inputted via the configuration interface: receive the virtual host setting inputted via a virtual host setting sub-interface in the configuration interface, the virtual host setting including at least one of the following: a virtual host adjustment setting, a streaming effect data displaying setting for the virtual host, and a streaming effect data analysis setting for the virtual host.

In an embodiment, the program 514 is further configured to cause the processor 502 to, when receiving the audience group setting inputted via the configuration interface: receive a streaming audience setting inputted via a streaming audience setting sub-interface in the configuration interface, the streaming audience setting including at least one of the following: an audience grouping parameter setting, a virtual host setting corresponding to each audience group, a streaming effect data displaying setting corresponding to each audience group, and a streaming effect data analysis setting corresponding to each audience group.

In an embodiment, the program 514 is further configured to cause the processor 502 to, when receiving the streaming object setting inputted via the configuration interface: receive the streaming object setting inputted via a streaming object setting sub-interface in the configuration interface, the streaming object setting including at least one of the following: a streaming object information and sequence setting, a streaming script setting corresponding to a streaming object, a streaming script and virtual host matching setting, a streaming effect data displaying setting of the streaming object, and a streaming effect data analysis setting of the streaming object.

In an embodiment, the program 514 is further configured to cause the processor 502 to, when the configuration input includes the virtual host setting and the audience group setting: in the virtual streaming room, for each audience group configured by the audience group setting, use a virtual host provided for the audience group to perform virtual streaming, and acquire and display streaming effect data of the audience group during the streaming process; based on the streaming effect data, determine whether the virtual host needs to be adjusted for the audience group; if so, then receive an adjustment setting inputted via the configuration interface, and dynamically adjust the virtual host based on the adjustment setting.

In an embodiment, the streaming effect data includes at least one of the following: viewer count data, average viewing duration data, viewing interaction rate data, streaming task completion count and/or proportion data, and average completed streaming task earnings data.

In an embodiment, the program 514 is further configured to cause the processor 502 to perform at least one of the following when receiving the adjustment setting inputted via the configuration interface and dynamically adjusting the virtual host based on the adjustment setting: displaying a virtual host adjustment sub-interface in the configuration interface, receiving an adjustment setting inputted via the virtual host adjustment sub-interface, and performing at least one of the following adjustments on the virtual host based on the adjustment setting: performing audience assignment proportion adjustment on the virtual host; performing host script adjustment on the virtual host; performing adjustment by replacing the original virtual host with a new virtual host; switching a virtual host of another audience group or a virtual host of another virtual streaming room to a current audience group; and performing host image adjustment and/or voice adjustment on the virtual host.

For specific implementation of each step in the program 514, reference can be made to corresponding description of the corresponding step and unit in the aforementioned embodiments of method for managing virtual streaming, and details will not be described herein. Those skilled in the art can clearly understand that for a convenient and concise description, for specific operation processes of the aforementioned devices and modules, references can be made to description of the corresponding processes in the aforementioned method embodiments, and details will not be described herein again.

The electronic device according to this embodiment provides a comprehensive streaming room configuration interface so that the virtual streaming room can be flexibly configured. In addition to solving the problems in which the forms of an existing virtual streaming room and virtual host are fixed, audience adhesion is poor, and use thereof is inflexible, the electronic device according to this embodiment can further track streaming viewing experience of the audiences in real time based on the streaming effect data and optimize and adjust the virtual host in a timely manner to better meet the requirements of the audiences and improve the streaming effect.

It should be pointed out that depending on requirements for implementation, each component/step described in the example embodiments can be split into more components/steps, or two or more components/steps or parts of the components/steps can be combined into new components/steps to achieve the objectives of the example embodiments.

The above method according to the example embodiments may be implemented in hardware or firmware, or may be implemented as software or computer code that can be stored in a recording medium (e.g., a CD-ROM, a RAM, a floppy disk, a hard disk, or an optical disc), or may be implemented as computer code downloaded over a network, originally stored in a remote recording medium or a non-transitory machine readable medium, and to be stored in a local recording medium. Thus, the method described herein can be processed by software stored in a recording medium used in a general-purpose computer, a special-purpose processor, or programmable or special-purpose hardware (e.g., an ASIC or an FPGA). It may be understood that a computer, a processor, a microprocessor controller, or programmable hardware includes a storage component (e.g., a RAM, a ROM, a flash, etc.) that can store or receive software or computer code that implements the method for managing virtual streaming described herein when accessed and executed by a computer, a processor, or hardware. In addition, when a general-purpose computer accesses code for implementing the method for managing virtual streaming illustrated herein, the execution of the code converts the general-purpose computer into a dedicated computer for performing the method for managing virtual streaming illustrated herein.

Those of ordinary skill in the art may be aware that, the units and method steps in the examples described with reference to the embodiments disclosed herein may be implemented by electronic hardware or a combination of computer software and electronic hardware. Whether these functions are performed by hardware or software depends on particular application and design constraint conditions of the technical solutions. A person skilled in the art may use a different method to implement the described functions for each particular application, but it should not be considered that such implementation goes beyond the scope of the example embodiments.

The above implementations are used merely to describe the example embodiments rather than limit the example embodiments. Those of ordinary skill in related art may also make various changes and variations without departing from the spirit and the scope of the example embodiments, so that all equivalent technical solutions also fall into the scope of the example embodiments. The scope of patent protection of the example embodiments shall be defined by the claims.

We claim:
1. A method comprising:
providing a configuration interface for configuring a virtual streaming room with configuration settings, the configuration settings including an audience group setting and a host setting related to a virtual host;
receiving, via the configuration interface, configuration input corresponding to one or more of the audience group setting and the host setting;

receiving, via the configuration interface, a streaming assistant setting corresponding to each audience group based on an audience feature of each audience group or a host feature of virtual hosts corresponding to each audience group, causing the streaming assistant to perform an auxiliary streaming operation on the virtual host corresponding to each audience group; and generating a host assignment rule based on the configuration input, wherein the configuration input comprises at least one feature of an audience group from the audience group setting, the host assignment rule used for assigning at least one virtual host to at least one audience group.

2. The method of claim 1, wherein the host assignment rule comprises one or more of:

assigning at least two virtual hosts to each group in a plurality of audience groups based on the audience group setting;

assigning different virtual hosts to a plurality of audience groups based on the audience group setting; and assigning a same virtual host to a portion of audience groups and assigning different virtual hosts to other audience groups based on the audience group setting.

3. The method of claim 2, wherein assigning at least two virtual hosts to each group in the plurality of audience groups comprises assigning, for a given group in the plurality of audience groups, at least two virtual hosts to the given group based on a pre-configured traffic assignment rule.

4. The method of claim 1, wherein generating the host assignment rule based on the configuration input comprises:

based on the configuration input corresponding to the audience group setting and the host setting, obtaining a host feature of each virtual host in a plurality of configured virtual hosts and an audience feature of each audience group; and assigning a matching virtual host to each audience group based on at least the host feature and the audience feature.

5. The method of claim 4, further comprising:

obtaining at least an object feature of at least a streaming object before assigning the matching virtual host to each audience group based on at least the host feature and the audience feature;

determining a candidate host feature and an candidate object feature matching the audience feature; and assigning to each audience group a virtual host corresponding to the candidate host feature and a streaming object corresponding to the candidate object feature.

6. The method of claim 1, further comprising:

providing a plurality of candidate virtual hosts;

receiving selection input corresponding to one of the plurality of candidate virtual hosts;

displaying information of the virtual host via the configuration interface; and receiving, via the configuration interface, a character setting associated with the virtual host, wherein generating the host assignment rule comprises assigning a matching virtual host to each audience group based on an audience feature of each audience group configured in the audience group setting and the character setting.

7. The method of claim 1, further comprising displaying information of an assigned virtual host via the configuration interface and setting a broadcasting style for the virtual host via the configuration interface.

8. The method of claim 7, further comprising controlling the virtual host to perform virtual streaming according to the broadcasting style during a streaming process.

9. The method of claim 1, further comprising receiving, via the configuration interface, configuration input corresponding to a streaming session, wherein generating the host assignment rule comprises generating a host assignment rule corresponding to the streaming session based on configuration input corresponding to a group setting or a host setting of the streaming session.

10. The method of claim 1, further comprising receiving, via the configuration interface, a streaming object setting corresponding to each audience group based on each audience group and audience feature, or a host feature of the virtual host corresponding to each audience group, causing the virtual host corresponding to each audience group to perform virtual streaming of the streaming object.

11. The method of claim 1, further comprising:

acquiring streaming effect data of each audience group in the virtual streaming room during a streaming process;

determining a virtual host that needs to be adjusted based on the streaming effect data; and dynamically adjusting the virtual host that needs to be adjusted.

12. The method of claim 11, wherein dynamically adjusting the virtual host that needs to be adjusted comprises one of:

performing an audience assignment proportion adjustment on the virtual host;

performing a host script adjustment on the virtual host;

performing an adjustment by replacing an original virtual host with a new virtual host;

performing an adjustment by switching between virtual hosts of different audience groups or between virtual hosts of different virtual streaming rooms; and performing a host image adjustment or voice adjustment on the virtual host.

13. The method of claim 12, wherein performing an adjustment by switching between virtual hosts of different audience groups or between virtual hosts of different virtual streaming rooms comprises:

receiving a host switching request from a streaming audience;

determining a virtual host to which the streaming audience needs to switch based on the host switching request; and switching from a current virtual host corresponding to the streaming audience to the virtual host that needs to be adjusted.

14. The method of claim 11, further comprising performing a statistical operation and analysis on the streaming effect data after streaming ends.

15. The method of claim 1, further comprising assigning a virtual host to audiences in the virtual streaming room based on the host assignment rule.

16. A non-transitory computer-readable storage medium for tangibly storing computer program instructions capable of being executed by a computer processor, the computer program instructions defining steps of:

providing a configuration interface for configuring a virtual streaming room with configuration settings, the configuration settings including an audience group setting and a host setting related to a virtual host;

receiving, via the configuration interface, configuration input corresponding to one or more of the audience group setting and the host setting; and receiving, via the configuration interface, a streaming assistant setting corresponding to each audience group based on an audience feature of each audience group or a host feature of virtual hosts corresponding to each audience group, causing the streaming assistant to perform an auxiliary streaming operation on the virtual host corresponding to each audience group; and generating a host assignment rule based on the configuration input wherein the configuration input comprises at least one feature of an audience group from the audience group setting, the host assignment rule used for assigning at least one virtual host to at least one audience group.

17. The non-transitory computer-readable storage medium of claim 16, the steps further comprising:

acquiring streaming effect data of each audience group in the virtual streaming room during a streaming process;

determining a virtual host that needs to be adjusted based on the streaming effect data; and dynamically adjusting the virtual host that needs to be adjusted.

18. A device comprising:

a processor; and a storage medium for tangibly storing thereon program logic for execution by the processor, the program logic comprising:

logic, executed by the processor, for providing a configuration interface for configuring a virtual streaming room with configuration settings, the configuration settings including an audience group setting and a host setting related to a virtual host;

logic, executed by the processor, for receiving, via the configuration interface, configuration input corresponding to one or more of the audience group setting and the host setting;

logic, executed by the processor, for receiving, via the configuration interface, a streaming assistant setting corresponding to each audience group based on an audience feature of each audience group or a host feature of virtual hosts corresponding to each audience group, causing the streaming assistant to perform an auxiliary streaming operation on the virtual host corresponding to each audience group; and logic, executed by the processor, for generating a host assignment rule based on the configuration input wherein the configuration input comprises at least one feature of an audience group from the audience group setting, the host assignment rule used for assigning at least one virtual host to at least one audience group.

19. The device of claim 18, the program logic further comprising:

logic, executed by the processor, for acquiring streaming effect data of each audience group in the virtual streaming room during a streaming process;

logic, executed by the processor, for determining a virtual host that needs to be adjusted based on the streaming effect data; and logic, executed by the processor, for dynamically adjusting the virtual host that needs to be adjusted.

* * * * *